(12) United States Patent
Jeon

(10) Patent No.: US 12,012,053 B2
(45) Date of Patent: Jun. 18, 2024

(54) IN-VEHICLE OPERATING DEVICE AND METHOD OF CONTROLLING SAME

(71) Applicants: SEOYON E-HWA CO., LTD., Anyang (KR); SEOYON AMERICA CORPORATION, Auburn Hills, MI (US)

(72) Inventor: Jong Hwan Jeon, Anyang (KR)

(73) Assignees: SEOYON E-HWA CO., LTD., Anyang (KR); SEOYON AMERICA CORPORATION, Auburn Hills, MI (US)

( * ) Notice: Subject to any disclaimer, the term of this patent is extended or adjusted under 35 U.S.C. 154(b) by 449 days.

(21) Appl. No.: 17/412,441

(22) Filed: Aug. 26, 2021

(65) Prior Publication Data

US 2022/0126766 A1  Apr. 28, 2022

(30) Foreign Application Priority Data

Oct. 28, 2020  (KR) .................. 10-2020-0141205

(51) Int. Cl.
*B60R 16/023*  (2006.01)
*B60R 16/00*  (2006.01)
*B60R 16/033*  (2006.01)

(52) U.S. Cl.
CPC .......... *B60R 16/023* (2013.01); *B60R 16/005* (2013.01); *B60R 16/033* (2013.01)

(58) Field of Classification Search
CPC .................................................. B60R 16/023
See application file for complete search history.

(56) References Cited

U.S. PATENT DOCUMENTS

| 9,263,936 | B2 * | 2/2016 | Jones | ............. H02M 1/44 |
| 2014/0007571 | A1 * | 1/2014 | Jee | ............. F03G 7/065 |
| | | | | 60/527 |
| 2014/0321173 | A1 * | 10/2014 | Jones | ............. H02J 3/38 |
| | | | | 363/40 |

FOREIGN PATENT DOCUMENTS

| JP | 2019127139 A | * | 8/2019 |
| JP | 2019127139 A |   | 8/2019 |

(Continued)

OTHER PUBLICATIONS

KR OA dated Dec. 22, 2020.

*Primary Examiner* — Jean Paul Cass
(74) *Attorney, Agent, or Firm* — Harvest IP Law, LLP

(57) ABSTRACT

An in-vehicle operating device is provided. The in-vehicle operating device includes a panel constituting a vehicle interior component and having an opening, an operation module provided to be movable in a backward-forward direction through the opening between a first position and a second position spaced apart from each other, with a button operated by a user being disposed on a front end thereof, an actuator including a plurality of shape-memory members contracting by applying current when heated and restored to an original state thereof when cooled, the plurality of shape-memory members including at least one first shape-memory member configured to move the operation module to the first position using a force generated during contraction and at least one second shape-memory member configured to move the operation module to the second position using a force generated during contraction, and a controller configured to supply current to the actuator while maintaining a voltage provided from a vehicle battery within a preset voltage range, and control an amount of current for each of the plurality of shape-memory members included in the (Continued)

actuator according to a condition for operating each of the plurality of shape-memory members.

20 Claims, 38 Drawing Sheets

(56) References Cited

FOREIGN PATENT DOCUMENTS

KR 101338137 B1 12/2013
WO WO-2012092333 A1 * 7/2012 ........... A61F 2/1629

* cited by examiner

FIG. 32

| Diameter Size inches (mm) | Resistance ohms/inch (ohms/meter) | Pull Force* pounds (grams) | Cooling Deformation Force* pounds (grams) | Approximate** Current for 1 Second Contraction (mA) | Cooling Time 158°F, 70°C "LT" Wire *** (seconds) | Cooling Time 194°F, 90°C "HT" Wire *** (seconds) |
|---|---|---|---|---|---|---|
| 0.001 (0.025) | 36.2 (1425) | 0.02 (8.9) | 0.008 (3.6) | 45 | 0.18 | 0.15 |
| 0.0015 (0.038) | 22.6 (890) | 0.04 (20) | 0.016 (8) | 55 | 0.24 | 0.20 |
| 0.002 (0.050) | 12.7 (500) | 0.08 (36) | 0.032 (14) | 85 | 0.4 | 0.3 |
| 0.003 (0.076) | 5.9 (232) | 0.18 (80) | 0.07 (32) | 150 | 0.8 | 0.7 |
| 0.004 (0.10) | 3.2 (126) | 0.31 (143) | 0.12 (57) | 200 | 1.1 | 0.9 |
| 0.005 (0.13) | 1.9 (75) | 0.49 (223) | 0.20 (89) | 320 | 1.6 | 1.4 |
| 0.006 (0.15) | 1.4 (55) | 0.71 (321) | 0.28 (128) | 410 | 2.0 | 1.7 |
| 0.008 (0.20) | 0.74 (29) | 1.26 (570) | 0.50 (228) | 660 | 3.2 | 2.7 |
| 0.010 (0.25) | 0.47 (18.5) | 1.96 (891) | 0.78 (356) | 1050 | 5.4 | 4.5 |
| 0.012 (0.31) | 0.31 (12.2) | 2.83 (1280) | 1.13 (512) | 1500 | 8.1 | 6.8 |
| 0.015 (0.38) | 0.21 (8.3) | 4.42 (2004) | 1.77 (802) | 2250 | 10.5 | 8.8 |
| 0.020 (0.51) | 0.11 (4.3) | 7.85 (3560) | 3.14 (1424) | 4000 | 16.8 | 14.0 | ns
IN-VEHICLE OPERATING DEVICE AND METHOD OF CONTROLLING SAME

CROSS REFERENCE TO RELATED APPLICATION

This application claims priority to Korean Patent Application No. 10-2020-0141205, filed on Oct. 28, 2020, the disclosure of which is incorporated herein by reference in its entirety.

BACKGROUND

1. Field

Apparatuses and methods consistent with exemplary embodiments relate to an in-vehicle operation device and a method of operating the in-vehicle operating device and, more particularly to an operating device including a button used by a user in a vehicle to operate a device installed in the vehicle, and a method of controlling the operating device.

2. Description of the Related Art

Vehicles include various devices related to driving and various devices related to user convenience (e.g., convenience of a driver and/or passengers). In order to operate these devices, various types of buttons (i.e., switches) operated by the user are provided at various positions in the vehicle.

Recently, as many functions are required in a vehicle, the number of buttons arranged in the vehicle is gradually increasing. A large number of buttons may give the user a complicated impression in terms of operation of the buttons, may cause a problem that the user operates the buttons incorrectly, and the buttons may greatly deteriorate the interior design of the vehicle.

Moreover, technologies for applying characteristics of a shape-memory alloy to operate a switch, such as a button, have been proposed. If a high voltage that does not comply with operating conditions is applied to the shape-memory alloy, the shape-memory alloy may be damaged. Therefore, techniques to prevent this damage are required.

In addition, there is a need for a control technique for consistent process operation because switches such as buttons using the property of the shape-memory alloy may operate too early or too late depending on an amount of electric current applied to the shape-memory alloy.

Further, because the shape-memory alloy responds sensitively to changes in temperature inside the vehicle due to changes in external environmental factors, the switches such as buttons may operate irregularly.

SUMMARY

Aspects of one or more exemplary embodiments provide an in-vehicle operating device configured to appear and disappear buttons using an operative force of an actuator. The in-vehicle operating device can improve visual perception and improve the design of the interior of a vehicle.

Aspects of one or more exemplary embodiments also provide an in-vehicle operating device that simplifies the appearance and disappearance of buttons. The in-vehicle operating device has the advantage of reducing the manufacturing cost, and has the advantage of quickly responding to a user's request for the appearance of the button.

According to one or more exemplary embodiments, it is possible to solve the problem that a shape-memory alloy is damaged due to irregular power supply when a property of the shape-memory alloy is used to operate switches such as buttons.

Aspects of one or more exemplary embodiments also provide a control technique for consistent process operation because switches such as buttons using the property of the shape-memory alloy may operate too early or too late depending on an amount of electric current applied to the shape-memory alloy.

According to one or more exemplary embodiments, it is possible to solve the problem that the shape-memory alloy reacts sensitively to a temperature change inside the vehicle due to a change of external environmental factors, so that switches such as buttons operate irregularly.

According to an aspect of an exemplary embodiment, there is provided an in-vehicle operating device including: a panel constituting a vehicle interior component and having an opening; an operation module provided to be movable in a backward-forward direction through the opening between a first position and a second position spaced apart from each other, with a button operated by a user being disposed on a front end thereof; an actuator including a plurality of shape-memory members contracting by applying current when heated and restored to an original state thereof when cooled, the plurality of shape-memory members including at least one first shape-memory member configured to move the operation module to the first position using a force generated during contraction and at least one second shape-memory member configured to move the operation module to the second position using a force generated during contraction; and a controller configured to supply current to the actuator while maintaining a voltage provided from a vehicle battery within a preset voltage range, and control an amount of current for each of the plurality of shape-memory members included in the actuator according to a condition for operating each of the plurality of shape-memory members.

The controller may include: an actuator driving device configured to supply current to the actuator according to a control signal while maintaining the voltage provided from the vehicle battery within the preset voltage range; and an actuator controller configured to transfer a control signal for controlling an amount of current for the actuator according to the condition for operating each of the plurality of shape-memory members to the actuator driving device.

The controller may include a plurality of actuator driving devices corresponding to the plurality of shape-memory members, and the actuator controller may individually transfer the control signal to each of the plurality of actuator driving devices.

The actuator may include a plurality of first shape-memory members and a plurality of second shape-memory members, the actuator controller may generate control signals for alternately or selectively controlling the plurality of first shape-memory members or the plurality of second shape-memory members to move the operation module to the first position or the second position, and the actuator driving device may alternately or selectively supply current to the plurality of first shape-memory members or the plurality of second shape-memory members according to the control signals while maintaining the voltage provided from the vehicle battery within the preset voltage.

The actuator controller may generate the control signals for alternately or selectively controlling the plurality of first shape-memory members or the plurality of second shape-memory members based on cycle times during which the first shape-memory member and the second shape-memory member are contracted and restored to the original state thereof according to the supply of current.

The actuator driving device may include: a power converter configured to convert the voltage provided from the vehicle battery into a predetermined voltage and maintain the converted voltage within a voltage range; a power supplier configured to supply current to each of the shape-memory members included in the actuator according to the control signal; and an electric current detector configured to measure the current supplied to each of the shape-memory members.

The actuator controller may include: an electric current analyzer configured to compare an amount of supplied current measured by the electric current detector and a reference amount of current according to the condition for operating and analyze a result; a correction value determiner configured to determine a current correction value based on a result of the analysis by the electric current analyzer; and a control signal generator configured to generate a control signal for controlling current to be supplied based on the current correction value.

The control signal generator may generate a control signal as a PWM (Pulse Width Modulation) signal for controlling a duty ratio of the current to be supplied based on the current correction value.

The actuator controller may further include a vehicle communication interface for receiving vehicle temperature information, and the electric current analyzer may receive the vehicle temperature information from the vehicle communication interface and may predict an amount of current to be supplied based on a value of a change in resistivity due to a change in temperature.

The in-vehicle operating device may further include a sensor configured to sense a user's motion for operating the button, wherein the controller may control operation of the actuator based on a sensing signal from the sensor.

The in-vehicle operating device may further include a finishing skin that is flexible and covers a surface of the panel with the button to provide a finishing surface, with a portion covering the button, of the finishing skin being moved together with the button so that a shape of the finishing surface changes according to a moving direction of the button.

According to an aspect of another exemplary embodiment, there is provided a method of controlling an in-vehicle operation device, the method including: generating, by a controller, a PWM control signal based on a reference amount of current according to a condition for operating a shape-memory member; supplying, by the controller, a PWM current to an actuator including the shape-memory member according to a control signal while maintaining a voltage within a preset voltage range; and moving, by the actuator, an operation module using deformation of the shape-memory member by application of current.

The supplying of the PWM electric current may include measuring current supplied to the actuator; and comparing an amount of measured supplied current and the reference amount of current, determining a current correction value according to a result of the comparison, and generating a PWM control signal for controlling current to be supplied based on the current correction value.

The comparing of the amount of supplied current may include: acquiring vehicle temperature information, predicting an amount of current to be supplied based on a value of resistance change due to temperature change, and comparing the predicted amount of current and the reference amount of current.

The comparing of the amount of supplied current may include generating a PWM control signal for adjusting a PWM current duty ratio of the current to be supplied based on the current correction value.

The actuator may include a plurality of shape-memory members including at least one first shape-memory member configured to move the operation module to a first position and at least one second shape-memory member configured to move the operation module to a second position. The controller may perform the generating of the PWM control signal, the supplying of the PWM current, and the moving of the operation module for each of the plurality of shape-memory members included in the actuator.

The actuator may include a plurality of shape-memory members including at least one first shape-memory member configured to move the operation module to a first position and at least one second shape-memory member configured to move the operation module to a second position. The controller may perform the generating PWM control signal, the supplying PWM current, the moving operation module, and the comparing amount of supplied current for each of the plurality of shape-memory members included in the actuator.

The actuator may include a plurality of the first shape-memory members configured to move the operation module to a first position and a plurality of the second shape-memory members configured to move the operation module to a second position. The controller may perform the generating of PWM control signal, the supplying of PWM current, the moving of operation module, and the comparing of the amount of supplied current to alternately or selectively control the plurality of first shape-memory members or the plurality of second shape-memory member to move the operation module to the first position or the second position.

The controller may perform the generating of the PWM control signal, the supplying of the PWM current, the moving of the operation module, and the comparing of the amount of supplied current to alternately or selectively control the plurality of first shape-memory members or the plurality of second shape-memory member based on cycle times during which the first shape-memory member and the second shape-memory member are contracted and restored to an original state thereof according to the supply of current.

The generating may be performed by receiving a sensing signal from a sensor that detects a user's manipulation of a button.

According to one or more exemplary embodiments, the button for the operation module becomes very visible to a user's eye (for example, a state in which the button is pushed out or pulled back into a surface of the panel) or becomes invisible to the user's eye (for example, a state in which the button is in the same as the surface of the panel) according to a position to which the operation module is moved along backward-forward direction through the opening. The improved visual recognizability and the enhanced design of the interior of a vehicle can be provided.

According to one or more exemplary embodiments, the current supplied to the shape-memory member of the actuator that moves the operation module is fed back, and the corrected current in compliance with the condition for operating the shape-memory member is supplied. Thus, the consistent process operation of the in-vehicle operating device can be possible.

Moreover, according to one or more exemplary embodiments, current is supplied in consideration of a change in resistivity of the shape-memory member due to a change in temperature. Thus, regardless of a change of season or a change of a region in which the in-vehicle operating device is used, the consistent process operation of the in-vehicle operating device can always be ensured. The actuation module remains deactivated in the first position and remains active in the second position. Accordingly, it is possible to fundamentally prevent a malfunction due to a user's erroneous operation of a button, thereby preventing a careless accident.

According to one or more exemplary embodiments, the operation module remains deactivated in the first position and remains active in the second position. Thus, it is possible to fundamentally prevent a malfunction due to the user's erroneous operation of the button, thereby preventing a careless accident.

BRIEF DESCRIPTION OF THE DRAWINGS

The above and other aspects will be more clearly understood from the following description of the exemplary embodiments with reference to the accompanying drawings, in which:

FIG. 32 is a view illustrating an implementation example of an operating condition of a shape-memory member that is applied to the exemplary embodiments;

DETAILED DESCRIPTION

Figure 1:
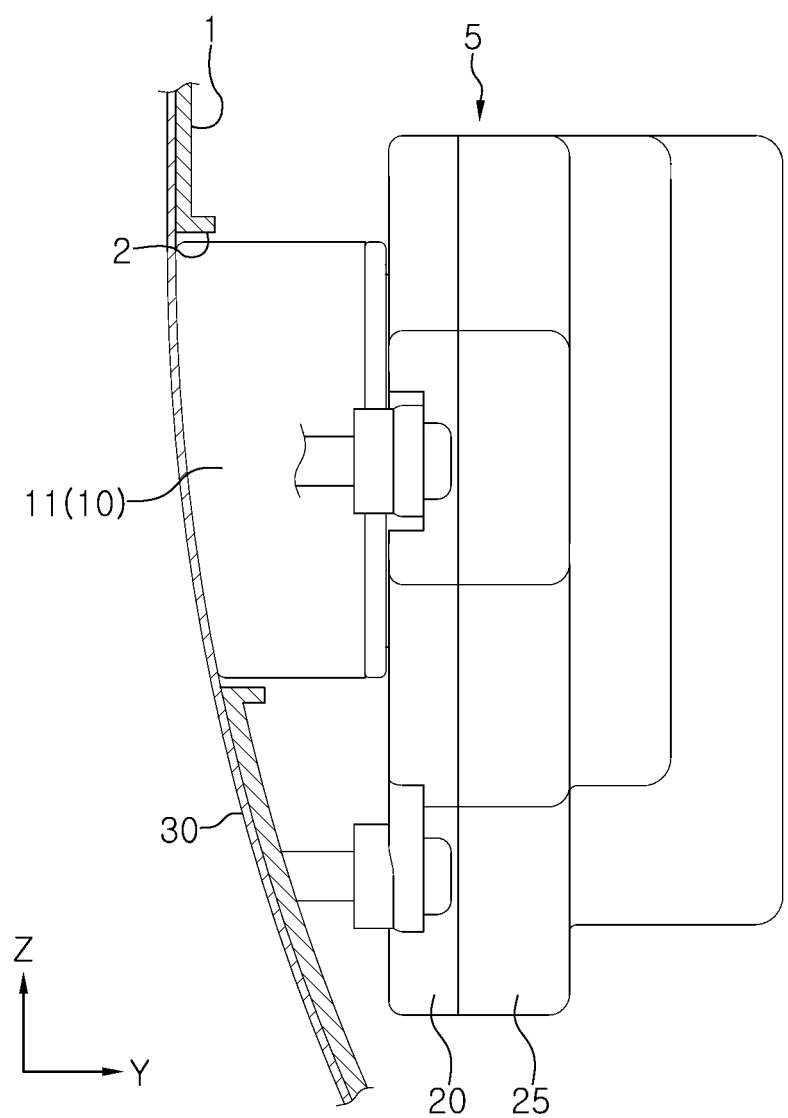
FIG. 1 is a side view illustrating an in-vehicle operating device according to a first exemplary embodiment.

Various modifications and various embodiments will be described with reference to the accompanying drawings. However, it should be noted that the various embodiments are not for limiting the scope of the disclosure to the specific embodiment, but they should be interpreted to include all modifications, equivalents, or substitutions of the embodiments included within the spirit and scope disclosed herein.

Terms used herein are used to merely describe specific embodiments and are not intended to limit the scope of the disclosure. As used herein, the singular forms "a", "an", and "the" are intended to include the plural forms as well, unless the context clearly indicates otherwise. In this specification, terms such as "comprise," "include," and/or "have/has"

should be construed as designating that there are such features, regions, integers, steps, operations, elements, components, and/or a combination thereof in the specification, not to exclude the presence or possibility of adding of one or more of other features, regions, integers, steps, operations, elements, components, and/or combinations thereof. In addition, if it is described that a certain element (e.g., first element) is "operatively or communicatively coupled with/to" or is "connected to" another element (e.g., second element), it should be understood that certain element may be connected to the other element directly or through still another element (e.g., third element).

Terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

An in-vehicle operating device according to an exemplary embodiment may be used to operate a device installed in a vehicle for driving, user convenience, and the like. The in-vehicle operating device may be provided on an interior component of the vehicle in a manner that can be operable by a user. Examples of a device operated by the in-vehicle operating device according to the exemplary embodiment (hereinafter referred to as controlled device) may include a starting device, a driving speed control device, an air conditioning device, a navigation device, a door lock device, a door opening and closing device, and an audio device. Examples of the interior component for which the in-vehicle operating device is provided may include a dashboard in a front interior, a console between a driver's seat and a passenger's seat, a door trim that makes up the interior space of the vehicle, an armrest on which a driver or a passenger rests his/her arm, and a hub which is a central portion of a steering system that the driver manipulates to steer. The controlled device may be electrically connected to the in-vehicle operating device.

Hereinafter, exemplary embodiments will be described in detail with reference to the accompanying drawings. However, the disclosure may be embodied in many different forms and is not limited to the embodiments described herein, and those skilled in the art may implement various modified forms of the contents described herein without departing from the scope of the disclosure. In order to clearly illustrate the disclosure in the drawings, some of the elements that are not essential to the complete understanding of the disclosure may be omitted, and like reference numerals refer to like elements throughout the specification FIGS. 1 to 12 illustrate a configuration, operation, and the like of an in-vehicle operating device according to a first exemplary embodiment.

Figure 2:
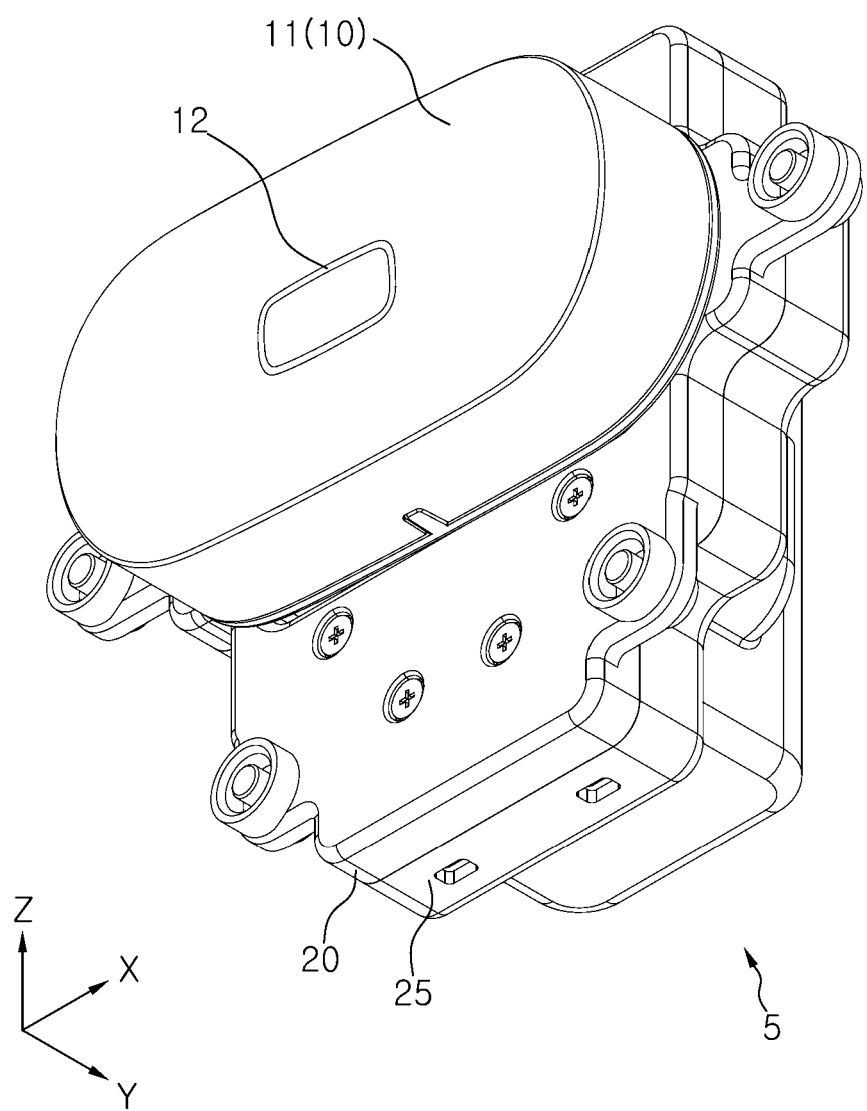
FIGS. 2 and 3 are perspective views each illustrating an operation module assembly of the in-vehicle operating device according to the first exemplary embodiment.
Figure 3:
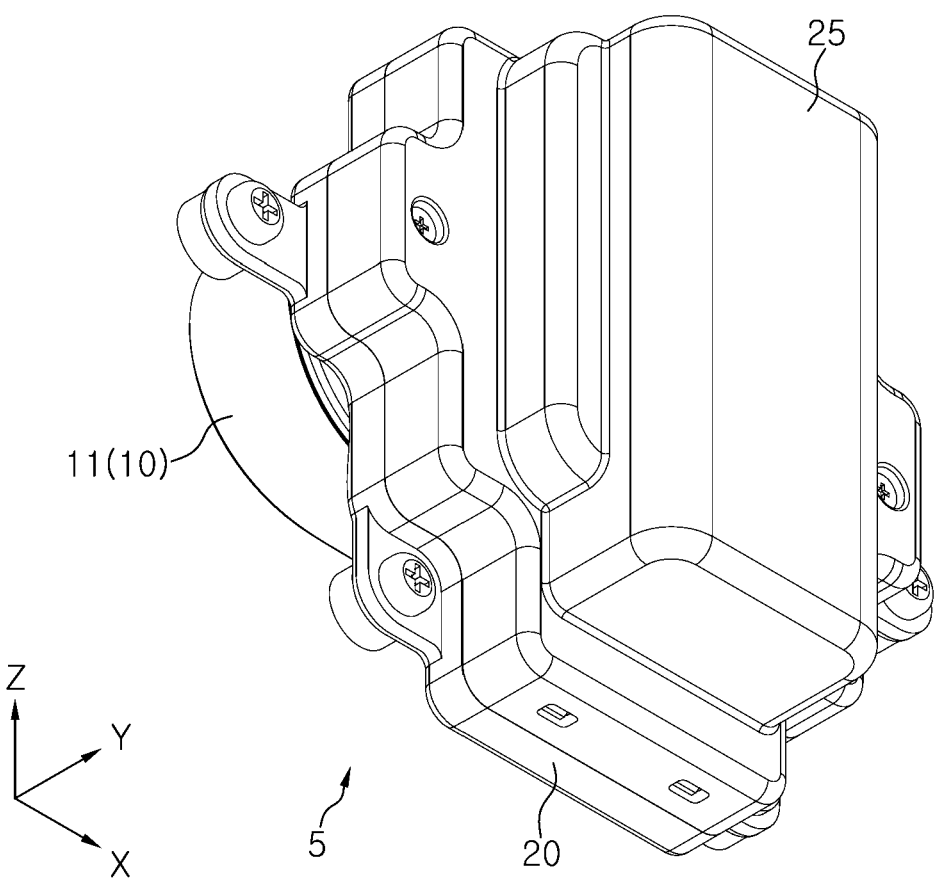
Figure 4:
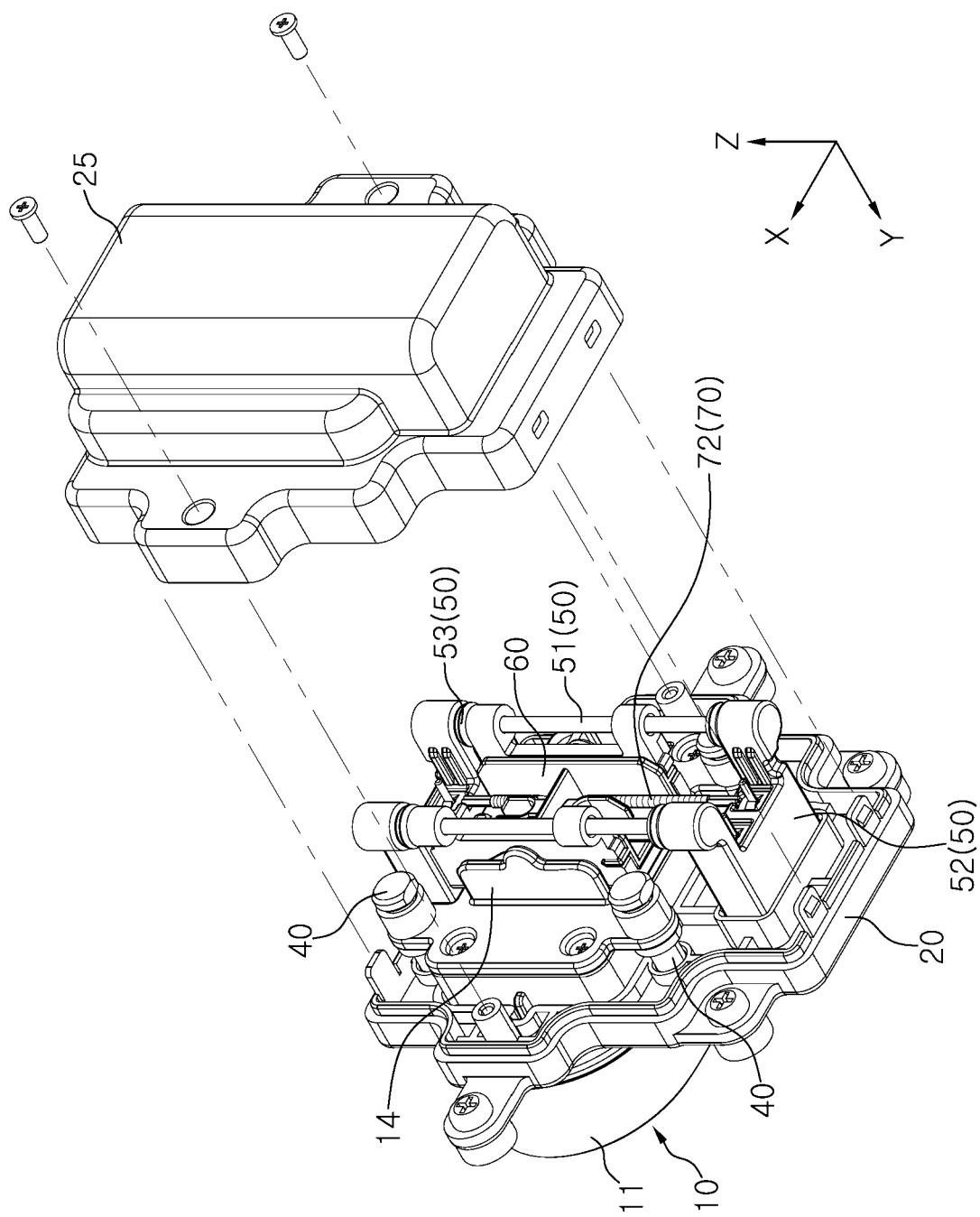
FIGS. 4 and 5 are perspective exploded views each illustrating the operation module assembly of the in-vehicle operating device according to the first exemplary embodiment.
Figure 5:
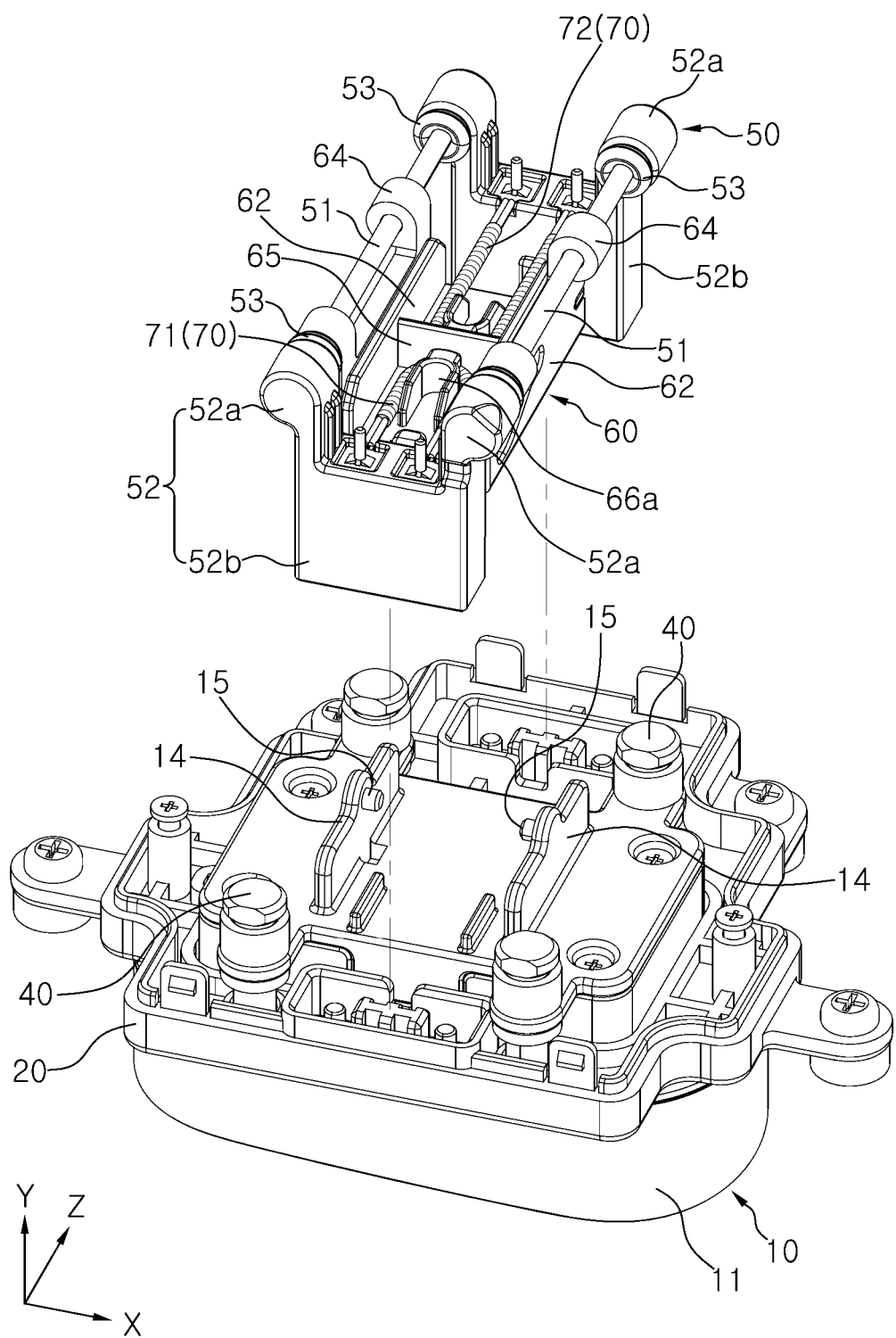

Referring to FIGS. 1 to 3, the in-vehicle operating device according to the first exemplary embodiment includes an operation panel 1 constituting an interior component of the vehicle and at least one operation module assembly 5 provided on the operation panel 1.

The operation panel 1 has a panel surface. The operation panel 1 may be configured such that the panel surface provides a part of the surface of the interior component or the entire surface of the interior component according to a type of the interior component. The operation panel 1 includes an opening 2 passing through the panel surface thereof.

The operation module assembly 5 includes an operation module 10 which includes a button 11 operated by a user. The button 11 is arranged on a front surface of the operation module 10 to constitute the front surface of the operation module 10, and appears through the opening 2 of the operation panel 1. For example, the button 11 may appear visually conspicuous by being pushed out or pulled back from the panel surface of the operation panel 1. The number of the opening 2 increases or decreases depending on the number of the operation module assembly 5.

The in-vehicle operating device may further include a finishing skin 30 providing a finished surface by covering the panel surface of the operation panel 1 together with the button 11. The finishing skin 30 may be provided in a size to cover part or all the panel surface of the operation panel 1 as well as the opening 2.

Because the finishing skin 30 has flexibility, when the button 11 is moved, a portion covering the button 11 is moved together with the button 11 so that a shape of the finishing surface may be changed. For example, a portion covering the button 11 of the flat-shaped finishing surface may be pushed and pulled by the button 11. Here, when the finishing surface returns to the flat shape, a shape of the button 11 is hidden. This change in shape prevents the button 11 from complicating an interior design of the vehicle.

The finishing skin 30 may be combined with the panel surface of the operation panel 1. When the button 11 is pulled back to the panel surface of the operation panel 1, a portion of the finishing skin 30 covering the button 11 may be combined with a surface of the button 11 so that the finishing skin 30 may be moved together with the button 11. The finishing skin 30 may be combined with the panel surface of the operation panel 1 or the surface of the button 11 using an adhesive or the like.

Figure 11:
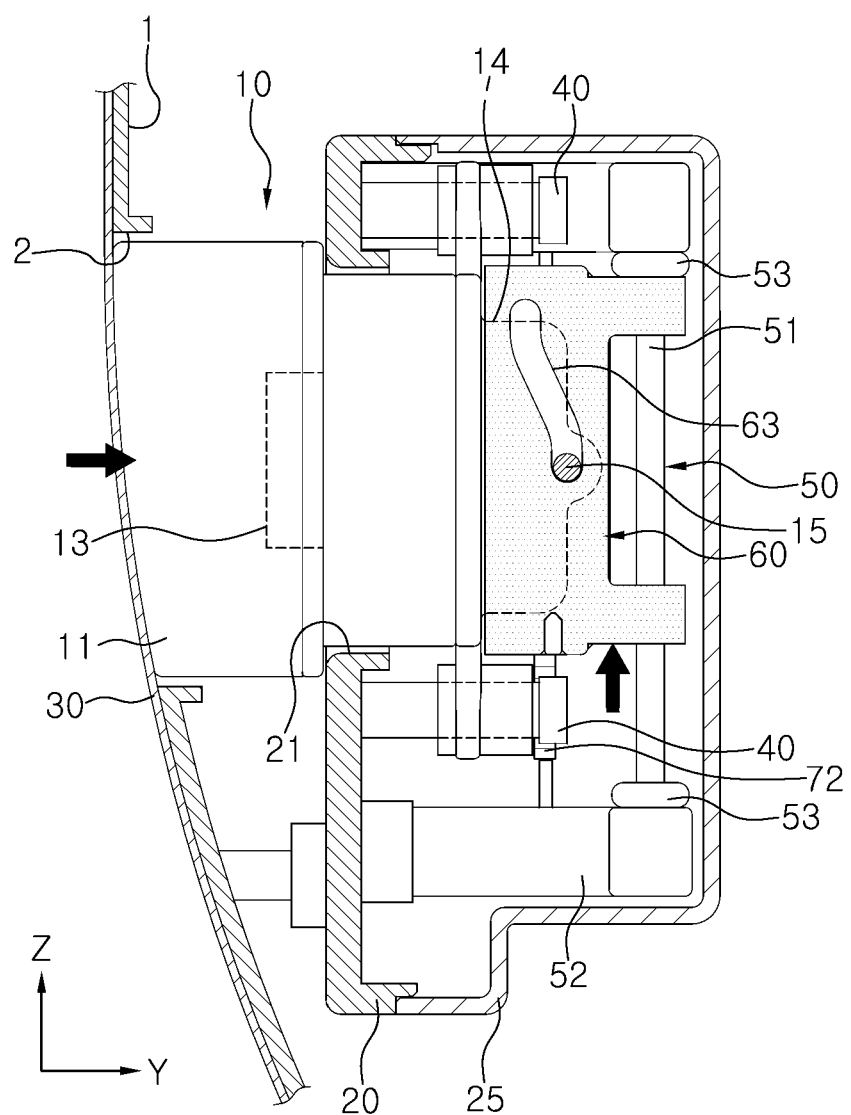
FIGS. 11 and 12 are perspective views each illustrating the operation of the in-vehicle operating device according to the first exemplary embodiment.
Figure 12:
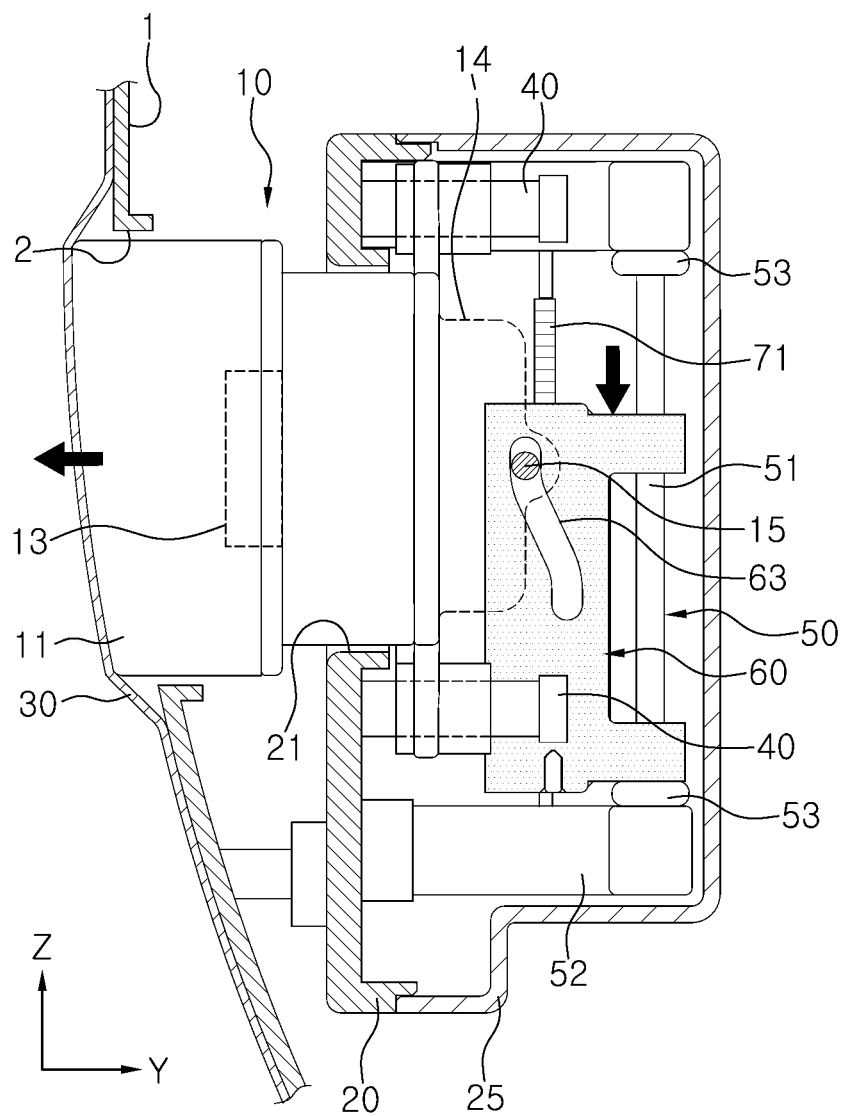

The operation module assembly 5 may further include a base 20 and a base cover 25. The base 20 is mounted on a rear portion of the operation panel 1. The base cover 25 is detachably coupled to the base 20 from behind the base 20. The base 20 and the base cover 25 are coupled to each other and are configured to form an accommodation space partially or entirely blocked from the outside. Referring to FIGS. 11 and 12, the base 20 is provided with a passing-through area 21 opposite to the opening 2 of the operation panel 1. For example, the passing-through area 21 may be a through-hole.

The operation module 10 is provided movably between a first position and a second position spaced apart from each other in a first direction (i.e., Y-axis direction), that is, in a backward-forward direction through the opening 2 in a state of being inserted into the passing-through area 21 of the base 20. The first position is a position at which the button 11 is accommodated in the opening 2. The button 11 is formed to be in the same plane as the panel surface of the operation panel 1 when the operation module 10 is positioned in the first position. The second position is located in front of the first position and is a position where the button 11 is pushed from the panel surface of the operation panel 1. As shown in FIG. 11, when the operation module 10 is positioned at the first position, the finishing skin 30 may provide the flat-shaped finishing surface so that the shape of the button 11 may be hidden. Also, as shown in FIG. 12, when the operation module 10 is moved to the second position to push the button 11 from the panel surface of the operation panel 1, the portion covering the button 11 of the finishing skin 30 may be deformed to be pushed out of the panel surface by the button 11 so that the shape of the button 11 may appear visually conspicuous.

Alternatively, the second position may be located behind the first position and may be a position where the button 11 is pulled back to the panel surface of the operation panel 1. In this case, when the operation module 10 is moved to the second position, the portion covering the button 11 of the finishing skin 30 may be deformed to be pulled back so that the shape of the button 11 may appear visually conspicuous.

Referring to FIGS. 4, 5, 11 and 12, the operation module 10 is precisely moved in the Y-axis direction by a first guide 40. The first guide 40 is mounted on a rear portion of the base 20. The first guide 40 may be arranged near the passing-through area 21 and may include guide pins extending in the Y-axis direction. The operation module 10 may have guide holes into which the guide pins are respectively inserted, and may be moved in the Y-axis direction with the guidance of the guide pins.

The operation module assembly 5 may further include a driving device for moving the operation module 10 in the Y-axis direction to position the operation module 10 in the first position or the second position.

The driving device includes an actuator 70 providing a driving force for moving the operation module 10, and the operation module 10 is moved with the driving force from the actuator 70. The driving device includes a moving member 60, the actuator 70, and a cam mechanism. The moving member 60 is provided behind the operation module 10 to be movable back and forth in a second direction intersecting the Y-axis direction with the guidance of a second guide 50. The actuator 70 moves the moving member 60 in the second direction. The cam mechanism converts a motion in the second direction of the moving member 60 by the actuator 70 into a motion in the Y-axis direction and transfers the resulting motion to the operation module 10.

The second direction is an up-down direction perpendicular to the Y-axis direction that is the back-forth direction. The moving member 60 is precisely moved in the second direction (i.e., Z-axis direction). Alternatively, the second direction may be a left-right direction (i.e., X-axis direction) perpendicular to the Y-axis direction.

The second guide 50 is mounted on the rear portion of the base 20. The second guide 50 includes two guide rods 51 and two mounting blocks 52. The two mounting blocks 52 are respectively arranged in both sides of the X-axis direction with the moving member 60 interposed therebetween. One mounting block 52 supports first side end of the two guide rods 51, and the other mounting block 52 supports second side end of the two guide rods 51. The two guide rods 51 extend in the Z-axis direction and have a predetermined length. The two mounting blocks 52 are coupled to the rear portion of the base 20. Each of the two mounting blocks 52 may have a pair of support blocks 52*a* and a base block 52*b* connecting the pair of support blocks 52*a* to each other. One support block 52*a* may support first side end of the two guide rods 51, and the other support block 52*a* may support second side end of the two guide rods 51. The base block 52*b* may be coupled to the rear portion of the base 20.

The cam mechanism includes a cam element having a guidance path 63 and a cam pin 15 connected to the guidance path 63. The cam mechanism may be configured to provide the cam element and the cam pin 15 to the moving member 60 and the operation module 10, respectively, and to move the operation module 10 to the first position or the second position according to a moving direction of the moving member 60. At this point, the cam pin 15 functions as a cam follower. Alternatively, the cam mechanism may be configured to provide the cam element and the cam pin 15 to the operation module 10 and the moving member 60, respectively, and to move the operation module 10 to the first position or the second position according to a moving direction of the moving member 60.

Figure 7:
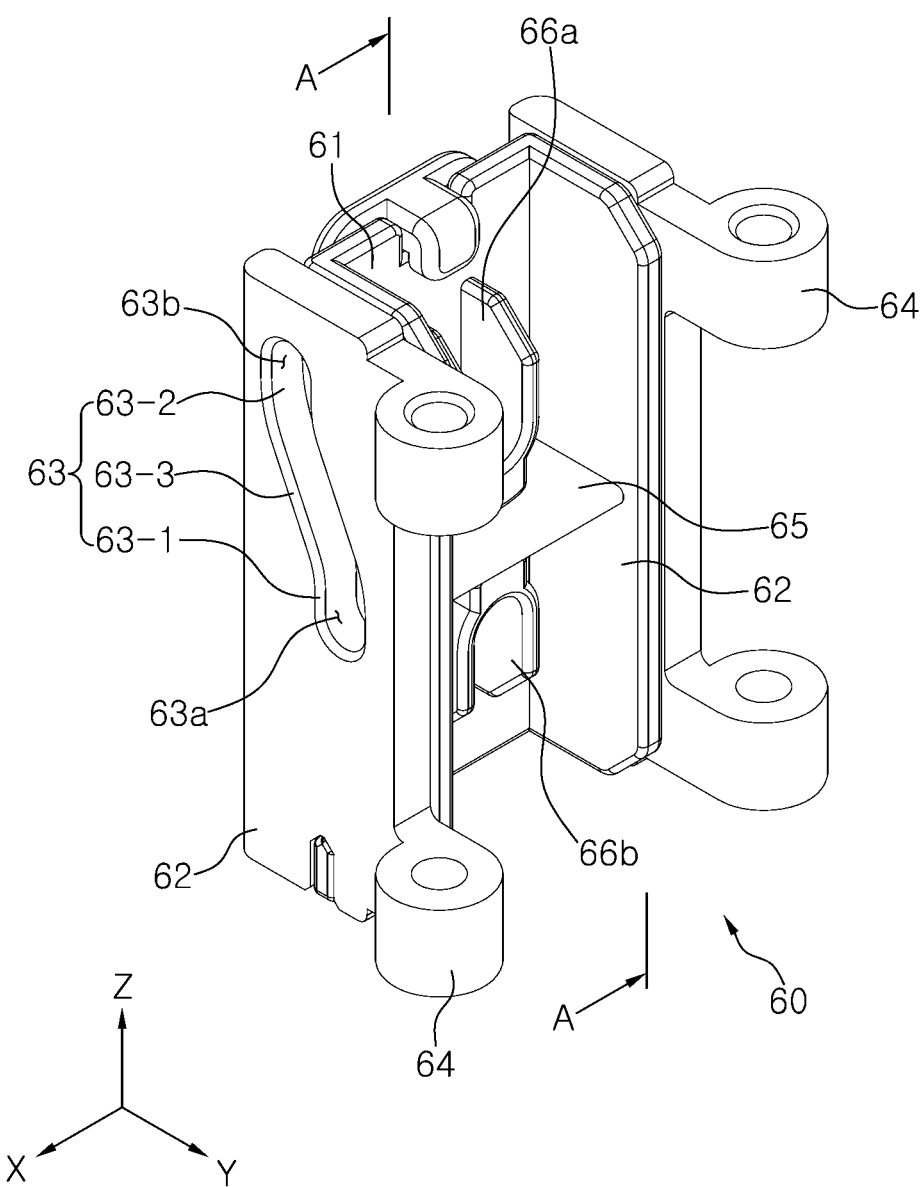
FIG. 7 is a perspective view illustrating a moving member illustrated in FIGS. 4 and 5.
Figure 8:
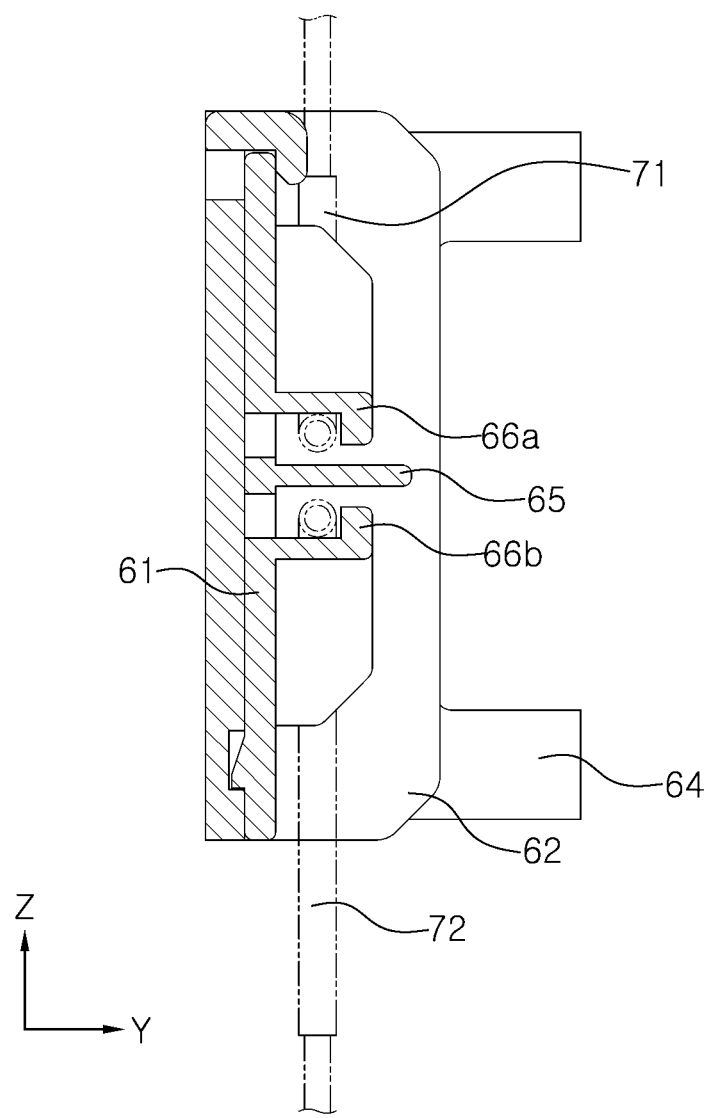
FIG. 8 is a cross-sectional view taken along line A-A of FIG. 7.
Figure 9:
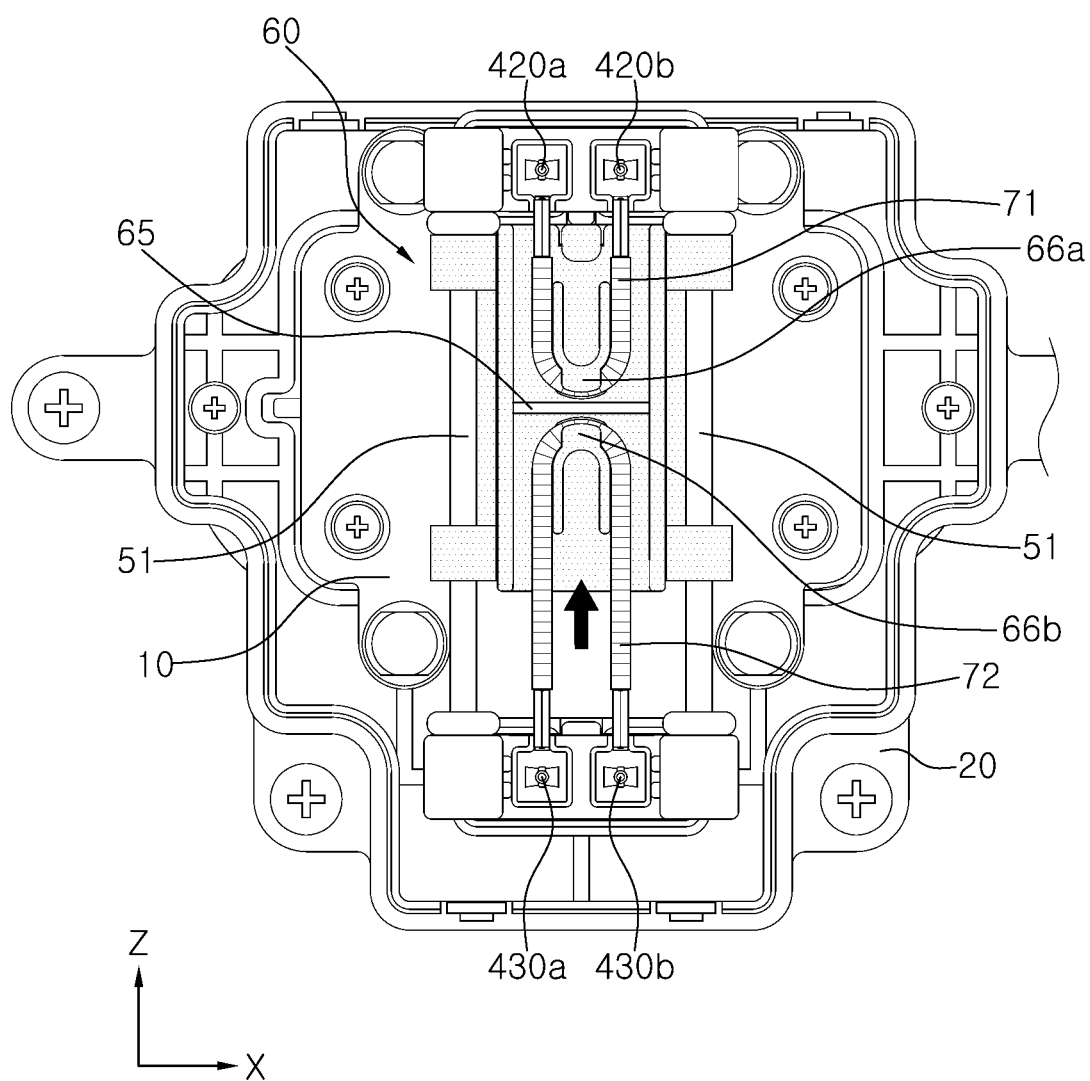
FIGS. 9 and 10 are rear views each illustrating operation of the in-vehicle operating device according to the first exemplary embodiment.
Figure 10:
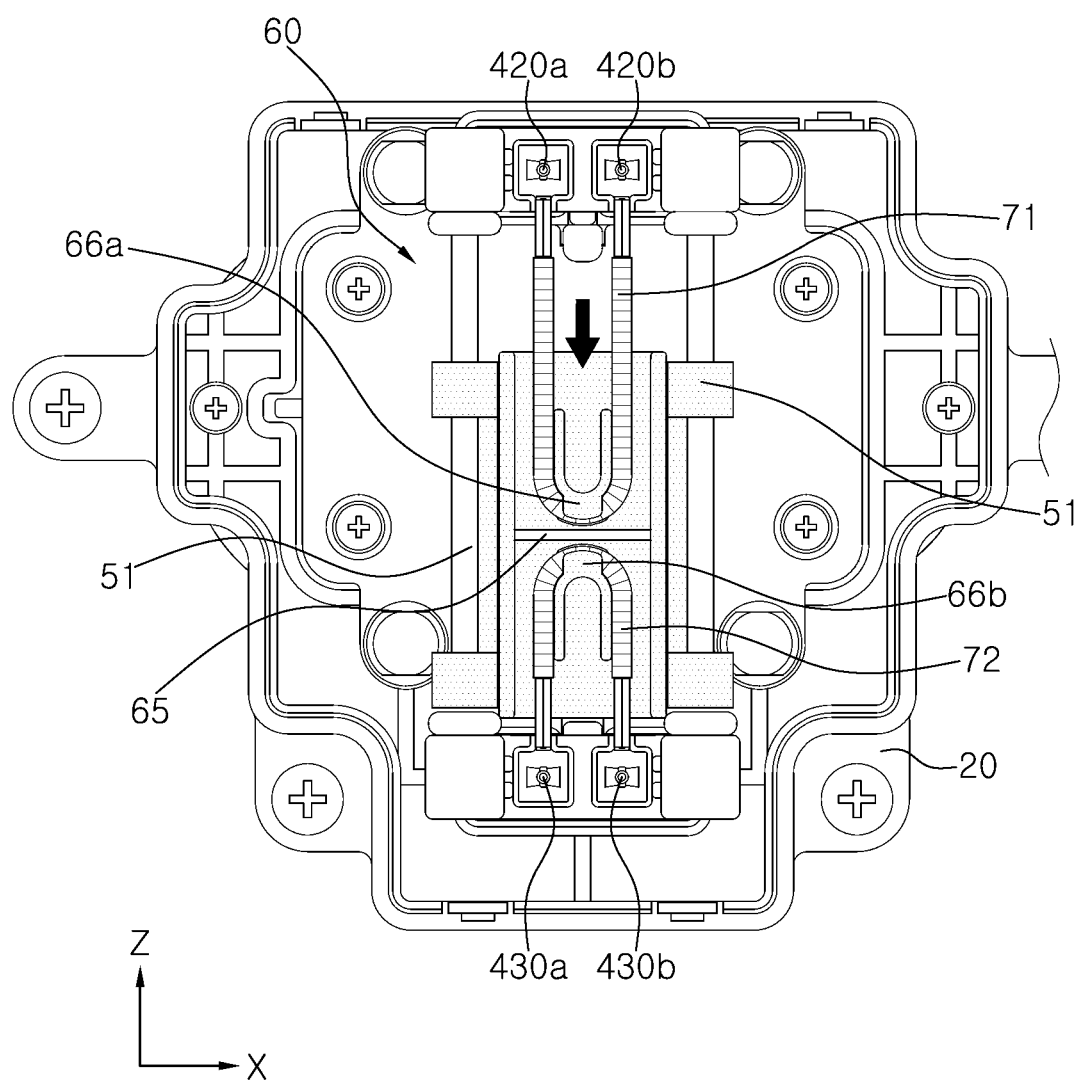

Referring to FIGS. 7 and 8, the moving member 60 may include a front wall 61 and two side walls 62. The two side walls 62 arranged at a certain distance from each other are connected to the left and right sides of the front wall 61 in an upright position, respectively. Each of the two side walls 62 has two internal walls opposite to each other and an external wall opposite the internal wall. The two side walls 62 are arranged on a rear portion of the front wall 61. An imaginary parallelepiped formed by this arrangement of the front wall 61 and the two side walls 62 may have a structure in which the top, the bottom, and the rear portion are open. The moving member 60 is provided with guide blocks 64 through which the two guide rods 51 pass through the two side walls 62, respectively, and may be moved in the Z-axis direction according to the guidance of the two guide rods 51. A pair of the cam elements may be provided, which may each be provided on the external walls of the two side walls 62. The cam elements may be provided to constitute part or all of the two side walls 62. The guidance path 63 may be provided in the form of a groove or a hole.

The operation module 10 may be provided with two brackets 14 opposite to the external walls of the two side walls 62, respectively, at a rear portion thereof. A pair of the cam pins 15 may be provided. A pair of cam pins 15 may be provided in each of the two brackets 14 to be respectively inserted into the guidance paths 63 in the pair of cam elements. Thus, the cam pins 15 may be connected to each guidance path 63.

The guidance path 63 has a first end area 63*a* and a second end area 63*b*. The first end area 63*a* serves to position the operation module 10 in the first position, and the second end area 63*b* serves to position the operation module 10 in the second position. The first end area 63*a* and the second end area 63*b* are spaced apart from each other in the Y-axis direction and spaced apart from each other in the Z-axis direction. The first end area 63*a* is disposed behind the second end area 63*b*.

The guidance path 63 is divided into a first horizontal section 63-1, a second horizontal section 63-2, and an inclined section 63-3. The first end area 63*a* is arranged in the first horizontal section 63-1, and the second end area 63*b* is arranged in the second horizontal section 63-2. The inclined section 63-3 is disposed between the first end area 63*a* and the second end area 63*b* so that both end portions thereof are positioned on the first end area 63*a* side and the second end area 63*b* side, respectively. The first horizontal section 63-1 extends downwardly in a direction opposite to the second end area 63*b* along the Z-axis direction from the first end area 63*a* side end portion of both end portions of the inclined section 63-3. The second horizontal section 63-2 extends upwardly in a direction opposite to the first end area 63*a* along the Z-axis direction from the second end area 63*b* side end portion of both end portions of the inclined section 63-3.

When the operation module 10 is positioned in the first position, the cam pin 15 is arranged in the first end area 63*a* of the first horizontal section 63-1. In this state, when the moving member 60 moves downward along the Z-axis direction, the cam pin 15 enters the second horizontal section 63-2 through the inclined section 63-3 and is placed in the second end area 63*b*. Further, the operation module 10 moves forward in the Y-axis direction as the cam pin 15 moves along the inclined section 63-3 (here, the inclined section 63-3 provides a downward inclined path in the forward direction based on a moving direction of the cam pin 15). In this case, the operation module 10 is moved to the second position, the button 11 is pushed out from the panel surface of the operation panel 1, and the finishing skin 30 is deformed into a shape in which the portion covering the button 11 is pushed out from the panel surface.

Thereafter, when the moving member 60 is moved upward along the Z-axis direction, the cam pin 15 enters the first horizontal section 63-1 through the inclined section 63-3 and is arranged in the first end area 63*a*. Further, the operation module 10 is moved backward along the Y-axis direction as the cam pin 15 is moved along the inclined section 63-3 (here, the inclined section 63-3 provides an upward inclined path in the backward direction based on the moving direction of the cam pin 15). In this case, the operation module 10 is moved (returned) to the first position, the button 11 is placed on the same plane as the panel surface of the operation panel 1, and the finishing skin 30 is restored to its original state to provide a flat finishing surface.

The first end area 63*a* and the second end area 63*b* are respectively disposed in the first horizontal section 63-1 and the second horizontal section 63-2 extending in the Z-axis direction. When the operation module 10 is moved to the first position, the cam pin 15 is arranged in the first horizontal section 63-1, and when the operation module 10 is moved to the second position, the cam pin 15 is arranged in the second horizontal section 63-2. According to this configuration, although a position of the moving member 60 is not fixed by a driving force of the actuator 70, a movement in the Y-axis direction of the operation module 10 positioned at the first position or the second position is blocked by the first horizontal section 63-1 or the second horizontal section 63-2. Due to this blocking, the operation module 10 may be stably maintained in the first position or the second position without the driving force of the actuator 70. Thus, it is possible to save energy required to operate the actuator 70.

Referring to FIGS. 4, 5 and 7 to 12, two dampers 53 are arranged in the Z-axis direction on both end portions of one guide block supported by the two mounting blocks 52, respectively, and other two dampers 53 are arranged in the Z-axis direction on both end portions of the other guide block supported by the two mounting blocks 52, respectively. The dampers 53 serve to limit a moving distance of the moving member 60 and to absorb shock. The guide block 64 may collide with one damper 53 on either side of both sides in the Z-axis direction according to the moving direction of the moving member 60. The damper 53 can protect the operation module assembly 5 by absorbing shock caused by the collision. For example, the damper 53 may be made of an elastic material such as rubber.

The actuator 70 is a shape-memory actuator including a first shape-memory member 71 and a second shape-memory member 72 that contract when heated. The first shape-memory member 71 and the second shape-memory member 72 are made of a shape-memory material such as shape-memory resin or a shape-memory ally (SMA). For example, the first shape-memory member 71 and the second shape-memory member 72 may be a wire made of shape-memory alloy. At least a portion of each of the first shape-memory member 71 and the second shape-memory member 72 is formed in the shape of a coil. When the first shape-memory member 71 and the second shape-memory member 72 are formed in the coil shape, displacement due to a change in their respective lengths can be greatly increased.

Each of the first shape-memory member 71 and the second shape-memory member 72 is connected to the moving member 60. When contracting, the first shape-memory member 71 moves the moving member 60 upward along the Z-axis direction, and the second shape-memory member 72 moves the moving member 60 downward along the Z-axis direction. Therefore, the actuator 70 including the first shape-memory member 71 and the second shape-memory member 72 may operate without noise to move the moving member 60 in the Z-axis direction.

The first shape-memory member 71 and the second shape-memory member 72 are respectively arranged in both sides in the Z-axis direction with the moving member 60 interposed therebetween. That is, the first shape-memory member 71 is arranged toward the upper side in the Z-axis direction, and the second shape-memory member 72 is arranged toward the lower side in the Z-axis direction. The moving member 60 has two jaws 66*a* and 66*b* respectively connected to the first shape-memory member 71 and the second shape-memory member 72. The two jaws 66*a* and 66*b* are arranged in the Z-axis direction. The two jaws 66*a* and 66*b* may be provided on the rear portion of the front wall 61. The first shape-memory member 71 and the second shape-memory member 72 are connected to the upper jaw 66*a* and the lower jaw 66*b*, respectively. The first shape-memory member 71 and the second shape-memory member 72 are formed to be bent in a U-shape toward the center so as to be connected in a suspended state to the two jaws 66*a* and 66*b*, respectively.

A pair of terminals are provided on each of the two mounting blocks 52 of the second guide 50. The pair of terminals may be arranged on the base block 52*b*. Ends of the first shape-memory member 71 having a substantially U shape are electrically connected to a pair of upper terminals, respectively. Ends of the second shape-memory member 72 having a substantially U shape are electrically connected to a pair of lower terminals, respectively. The first shape-memory member 71 and the second shape-memory member 72 receive electric current through the pair of upper terminals and the pair of lower terminals, respectively, and are heated to a temperature at which they can be contracted.

A barrier 65 for blocking thermal interference between the first shape-memory member 71 and the second shape-memory member 72 is disposed between the two jaws 66*a* and 66*b*. The barrier 65 may be configured to provide thermal insulation. The barrier 65 may be provided in the form of a partition dividing a space between the two side walls 62 into upper and lower sub-sides in the Z-axis direction, and protrudes from a rear surface of the front wall 61 to be positioned between the two jaws 66*a* and 66*b*.

The first shape-memory member 71 and the second shape-memory member 72 in the contracted state may be reused after being cooled to a predetermined temperature or less and restored to original shapes thereof. While either one of the first shape-memory member 71 and the second shape-memory member 72 is heated and then cooled, when the other one is heated, the cooling rate may be slowed by heat generated from the other one. However, the blocking of thermal transfer by the barrier 65 can minimize the problem of lowering the cooling speed. In addition, the blocking of thermal transfer can optimize cycle times for the reuse of the first shape-memory member 71 and the second shape-memory member 72.

For example, the cycle times for the reuse of the first shape-memory member 71 and the second shape-memory member 72 may be optimized with a configuration in which the movement of the operation module 10 in the Y-axis direction is restricted at the first position and the second position by the first horizontal section 63-1 and the second horizontal section 63-2 of the guidance path 63, respectively.

With this configuration, when the operation module 10 is moved to the first position, the supply of electric current to the first shape-memory member 71 is immediately blocked, and when the operation module 10 is moved to the second position, the supply of electric current to the second shape-memory member 72 is immediately blocked. Thus, the cycle times for the first shape-memory member 71 and the second shape-memory member 72 may be secured based on a point in time when the operation module 10 is no longer moved between the first position and the second position.

For example, the first horizontal section 63-1 and the second horizontal section 63-2 of the guidance path 63 are formed to extend to have a length in the Z-axis direction to form an additional space. Therefore, the cam pin 15 may be adaptively moved according to the length of the contraction of the first shape-memory member 71 and the second shape-memory member 72. Accordingly, the cam pin 15 may enter the additional space according to the length of the first shape-memory member 71 and the second shape-memory member 72 contracted. FIG. 11 illustrates a state in which the cam pin 15 enters the additional space at the end of the first horizontal section 63-1 because the first shape-memory member 71 is contracted to be greater than an estimated contract length. FIG. 12 illustrates a state in which the cam pin 15 does not enter the additional space at the end of the second horizontal section 63-2 because the second shape-memory member 72 is contracted by the same length as the estimated contract length.

Figure 6:
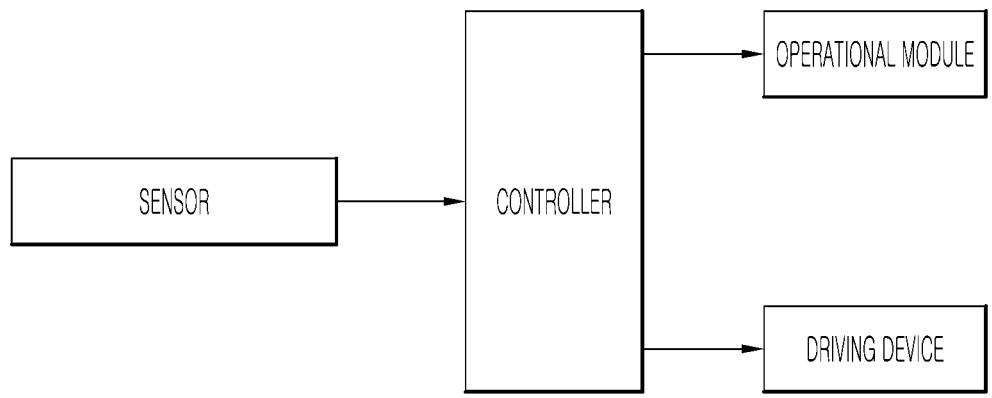
FIG. 6 is a block diagram illustrating some elements of the in-vehicle operating device according to the first exemplary embodiment.

Referring to FIG. 6, the in-vehicle operating device according to the first exemplary embodiment may further include a sensor and a controller. The sensor detects a user's motion for operating the button 11. The controller controls operation of the operation module 10 and operation of a driving device based on a detection signal from the sensor.

The sensor may be a proximity sensor that detects whether the user's hand or the like approaches the button 11. Examples of the sensor may include a magnetic proximity sensor, an ultrasonic proximity sensor, a high-frequency oscillation-type proximity sensor, and a capacitive proximity sensor. For example, an optical proximity sensor may include a light emitting element and a light receiving element receiving light from the light emitting element. The light emitting element may be a light emitting diode, and the light receiving element may be a phototransistor. For example, the sensor may be provided in the vicinity of the opening 2 of the panel surface of the operation panel 1.

When the detection signal is input from the sensor while the operation module 10 is positioned at the first position, the controller determines that the user attempts to operate the button 11, and controls electric current to be supplied to the second shape-memory member 72. At this time, the second shape-memory member 72 is heated and contracted by the resistance generated by the supplied electric current. Thus, the operation module 10 is moved to the second position.

When a preset time elapses after the operation module 10 is moved to the second position, the controller controls electric current to be supplied to the first shape-memory member 71. At this time, the first shape-memory member 71 is heated and contracted by the resistance generated by the supplied electric current. Thus, the operation module 10 is moved to the first position. While the first shape-memory member 71 is heated and contracted, the second shape-memory member 72 may be cooled for the predetermined time to restore its original shape. For example, a first setting time and a second setting time may be provided as the setting time. The first setting time is counted after a time point when the operation module 10 is moved to the second position, and the second setting time is counted after a time point when the button 11 of the operation module 10 positioned at the second position is operated by the user. When the longer of the first setting time and the second setting time has elapsed, the controller may control electric current to be supplied to the first shape-memory member 71.

The operation module 10 remains deactivated in the first position and remains active in the second position. Therefore, it is possible to prevent a problem that the controlled device is unintentionally manipulated due to the user's mistaken manipulation of the button 11 of the operation module 10 positioned at the first position. In order to switch the state of the operation module 10, the controller controls the operation module 10 to enter the inactivated state at the first position and enter the activated state at the second position.

Referring to FIGS. 2, 6, 11 and 12, the operation module 10 may further include a light source 13 for emitting light toward the surface of the button 11. The light source 13 may be built into the button 11 and may include a light emitting diode (LED). A transmissive area 12 and a non-transmissive area are provided on the surface of the button 11. The transmissive area 12 transmits light from the light source 13 and the non-transmissive area blocks the light from the light source 13. The transmissive area 12 may be formed to have the shape of a letter and/or a figure indicating a function of the button 11. The light source 13 remains turned off in the first position and remains turned on in the second position. In order to switch the state of the light source 13, the controller controls the light source 13 to be turned off in the first position and to be turned off in the second position.

The finishing skin 30 has a predetermined light transmittance and transmits light from the light source 13. For example, the finishing skin 30 may be a sheet made by weaving flexible fiber.

Figure 13:
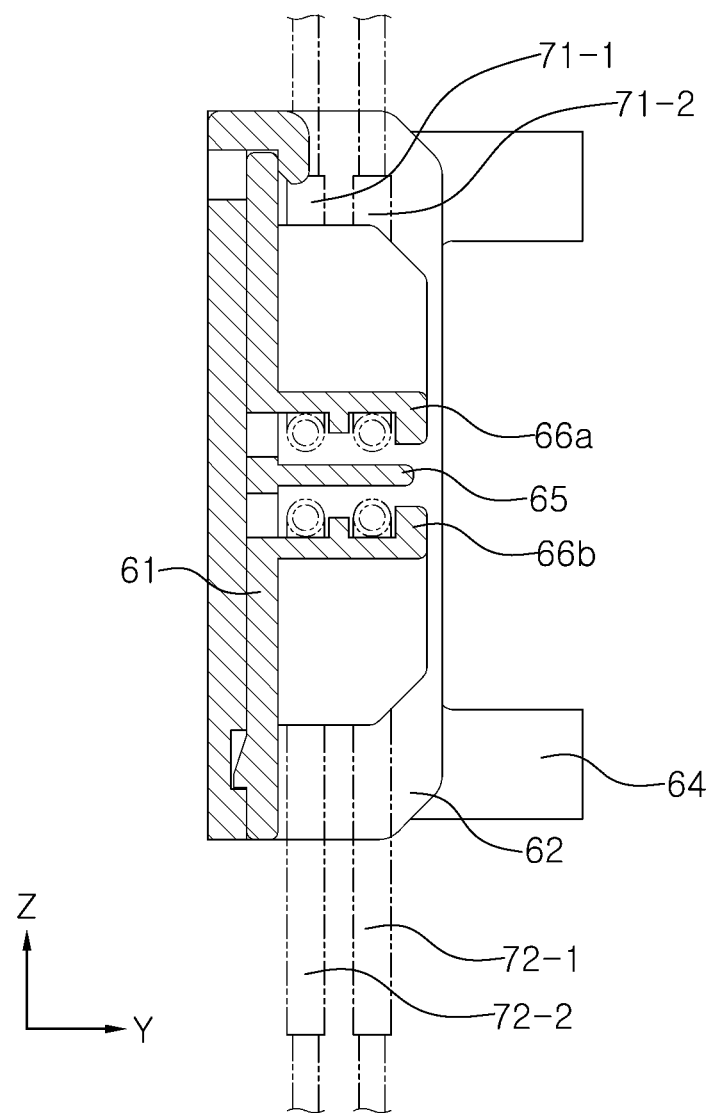
FIG. 13 is a cross-sectional view illustrating main elements of an in-vehicle operating device according to a second exemplary embodiment.
Figure 14:
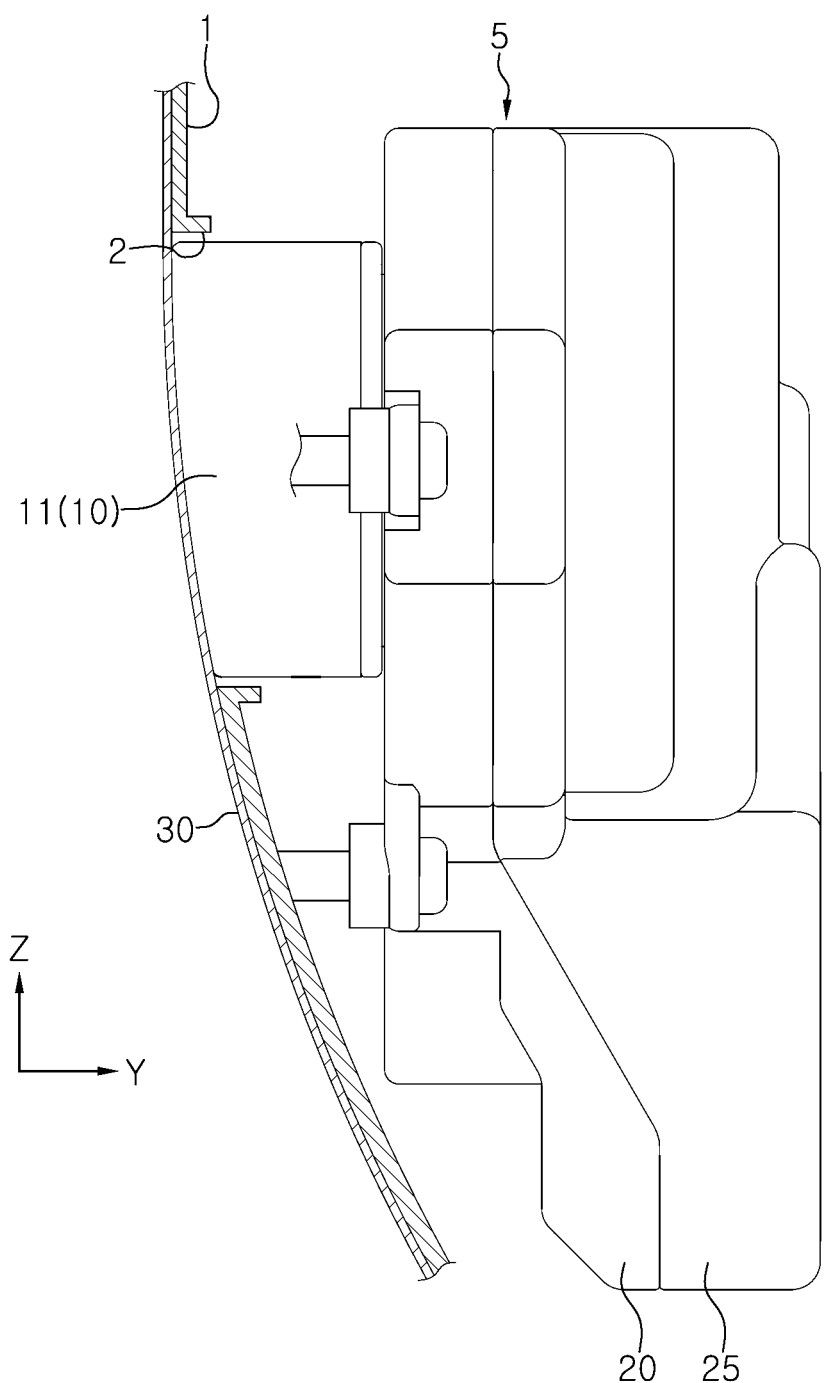
FIG. 14 is a perspective view illustrating an in-vehicle operating device according to a third exemplary embodiment.
Figure 15:
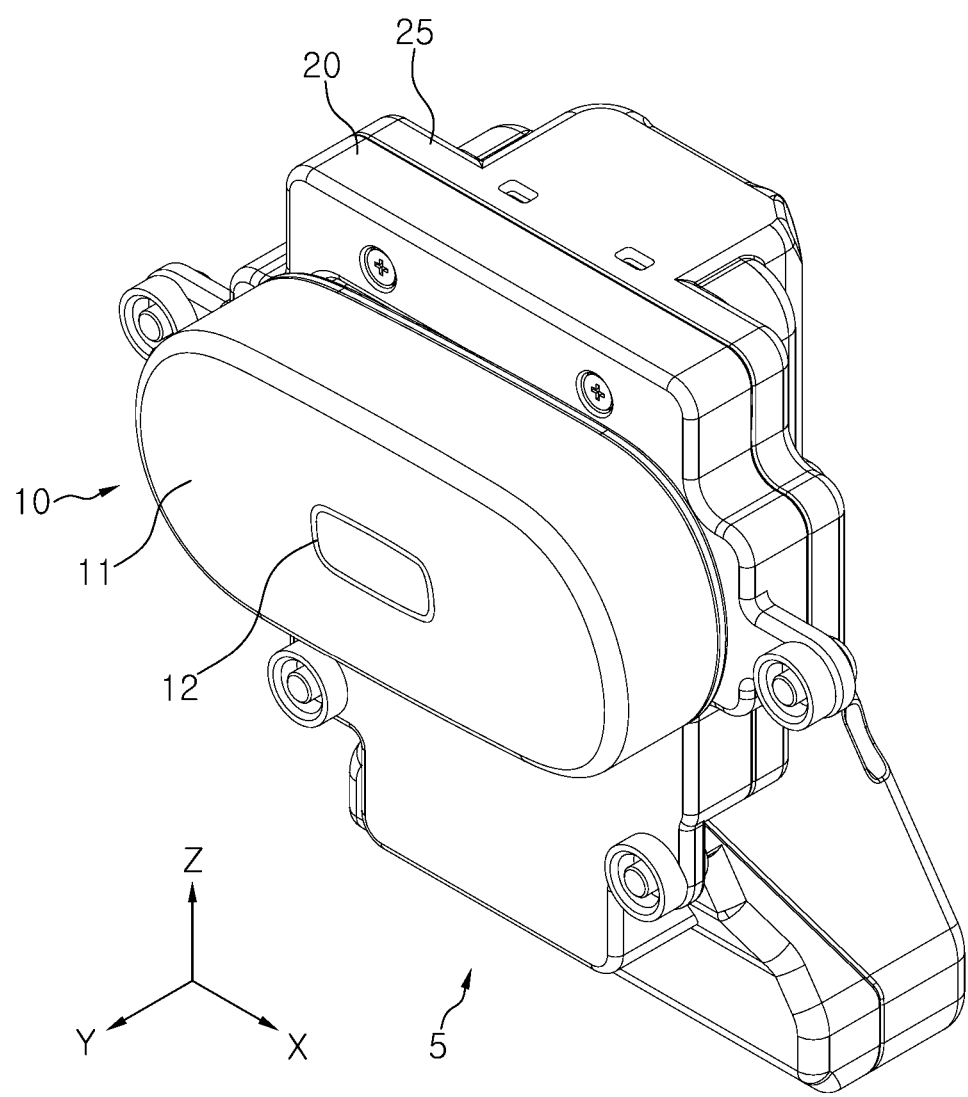
FIGS. 15 and 16 are perspective views each illustrating an operation module assembly of the in-vehicle operating device according to the third exemplary embodiment.
Figure 16:
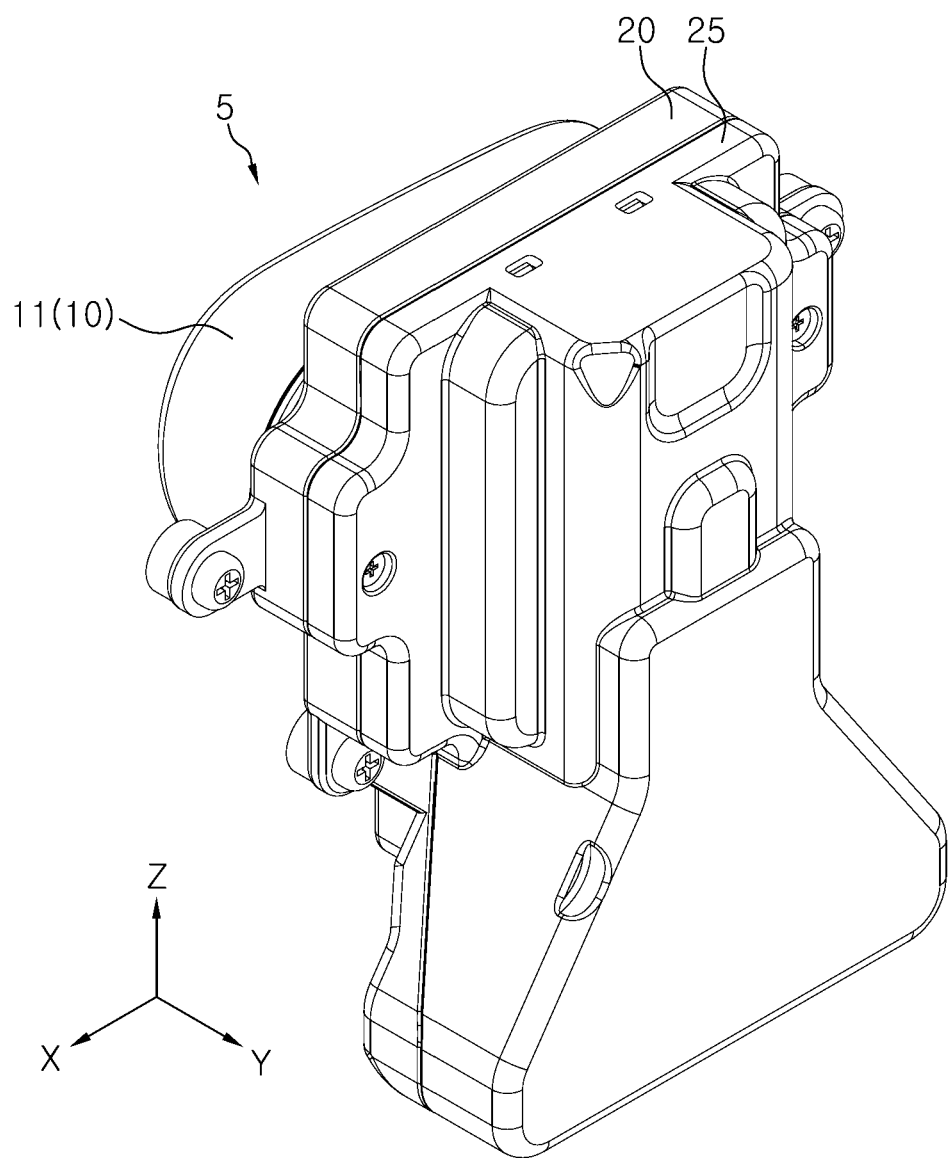
Figure 17:
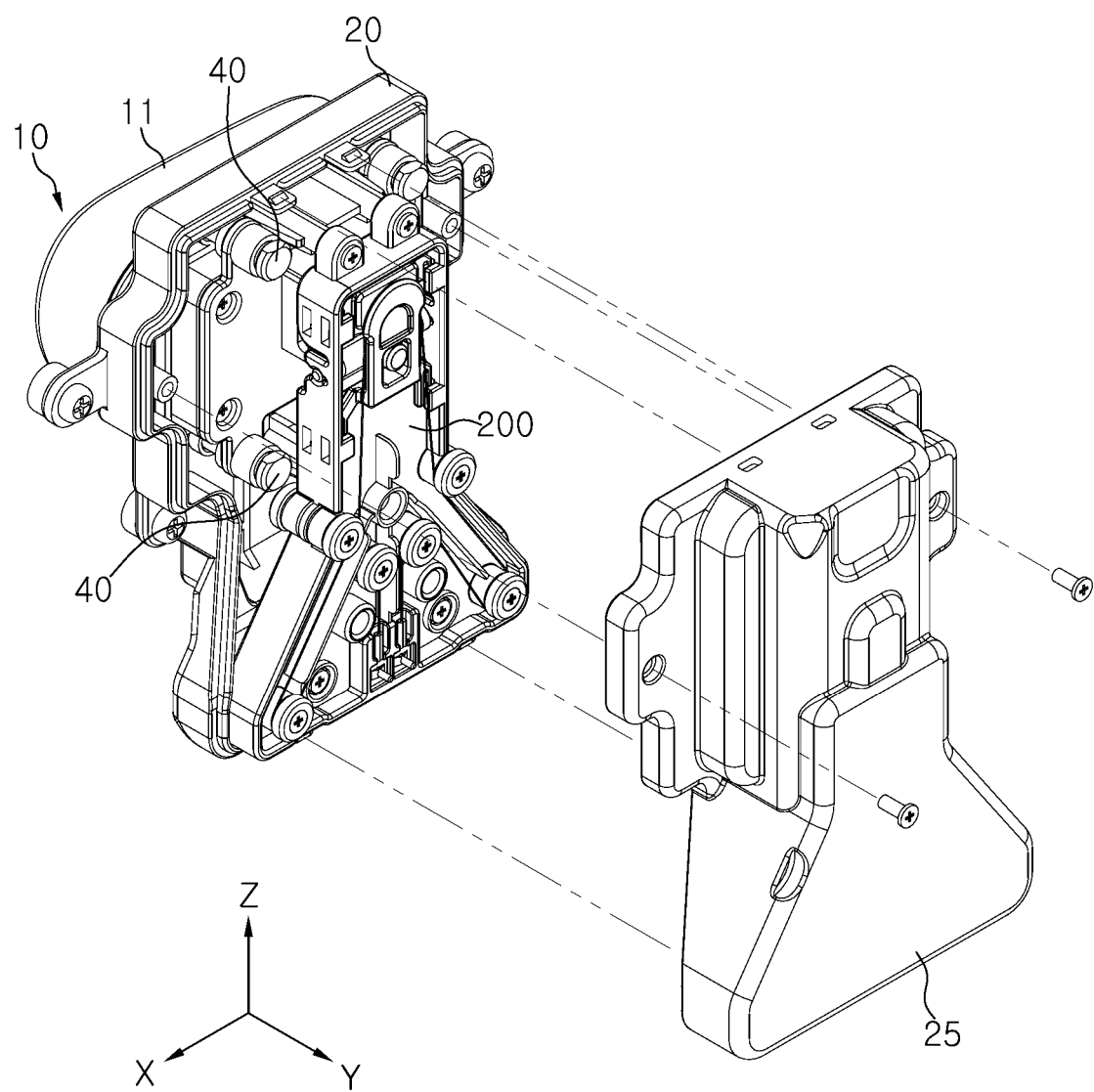
FIGS. 17 and 18 are perspective exploded views each illustrating the operation module assembly of the in-vehicle operating device according to the third exemplary embodiment.

FIG. 13 is a cross-sectional view illustrating main elements of an in-vehicle operating device according to a second exemplary embodiment. Referring to FIG. 13, the in-vehicle operating device according to the second exemplary embodiment has the same configuration and operation as those of the first exemplary embodiment except for a plurality of first shape-memory members 71-1 and 71-2 and a plurality of second shape-memory members 72-1 and 72-2, so a redundant description of the same configuration will be omitted. Here, the controller is configured to individually control the plurality of first shape-memory members 71-1 and 71-2 and the plurality of second shape-memory members 72-1 and 72-2. The plurality of first shape-memory members 71-1 and 71-2 are connected in a suspended state to the upper jaw 66a of the two jaws 66a and 66b of the moving member 60. The plurality of second shape-memory members 72-1 and 72-2 are connected in a suspended state to the lower jaw 66b thereof.

The plurality of first shape-memory members 71-1 and 71-2 may be suspended from the upper jaw 66a at a predetermined distance to be spaced apart from each other in the Y-axis direction. The plurality of second shape-memory members 72-1 and 72-2 may be suspended from the lower jaw 66b at a predetermined distance to be spaced apart from each other in the Y-axis direction. The upper jaw 66a and the lower jaw 66b may be formed in a double jaw structure to prevent interferences between the plurality of first shape-memory members 71-1 and 71-2 and the plurality of second shape-memory members 72-1 and 72-2.

Under the control of the controller, when the plurality of first shape-memory members 71-1 and 71-2 receive electric current and are contracted, the moving member 60 is moved upward in the Z-axis direction to move the operation module 10 to the first position (i.e., button returning). Under the control of the controller, the plurality of second shape-memory members 72-1 and 72-2 receive electric current and are contracted, the moving member 60 is moved downward in the Z-axis direction to move the operation module 10 to the second position (i.e., button pushing-out).

The controller moves the operation module 10 to the first position by controlling one or more members selected from among the plurality of first shape-memory members 71-1 and 71-2. Also, the controller moves the operation module 10 to the second position by controlling one or more members selected from among the plurality of second shape-memory members 72-1 and 72-2.

For example, the controller may move the operation module 10 to the first position by alternately controlling the plurality of first shape-memory members 71-1 and 71-2. Also, the controller may move the operation module 10 to the second position by alternately controlling the plurality of second shape-memory members 72-1 and 72-2.

For example, it is assumed that two first shape-memory members 71-1 and 71-2 and two second shape-memory members 72-1 and 72-2 are provided. The button pushing-out and button returning may be repeatedly performed by alternately performing first control and second control in this order. The first control is performed as follows. Electric current is supplied to one 72-1 of the two second shape-memory members 72-1 and 72-2 to move the operation module 10 to the second position (button pushing-out). Then, electric current supplied to one 72-1 of the two second shape-memory members 72-1 and 72-2 is blocked. Thereafter, electric current is supplied to one 71-1 of the two first shape-memory members 71-1 and 71-2 to move the operation module 10 to the first position (button returning). Then, electric current supplied to one 71-1 of the two first shape-memory members 71-1 and 71-2 is blocked. The second control is performed as follows. Electric current is supplied to one 72-2 of the two second shape-memory members 72-1 and 72-2 to move the operation module 10 to the second position (button pushing-out). Then, electric current supplied to one 72-2 of the two second shape-memory members 72-1 and 72-2 is blocked. Thereafter, electric current is supplied to one 71-2 of the two first shape-memory members 71-1 and 71-2 to move the operation module 10 to the first position (button returning). Then, electric current supplied to one 71-2 of the two first shape-memory members 71-1 and 71-2 is blocked. By the first control and the second control, the problem that the button pushing-out or the button returning cannot be performed immediately according to a user's demand because the cycle times for the reuse of the plurality of first shape-memory members 71-1 and 71-2 and the plurality of second shape-memory members 72-1 and 72-2 do not elapse. Moreover, it is possible to minimize the problem that the plurality of first shape-memory members 71-1 and 71-2 and the plurality of second shape-memory members 72-1 and 72-2 are damaged due to fatigue accumulation.

Alternatively, the controller may move the operation module 10 to the first position by controlling the first shape-memory member which is restored to be reusable after contraction among the plurality of first shape-memory members 71-1 and 71-2. Also, the controller may move the operation module 10 to the second position by controlling the second shape-memory member which is restored to be reused after contraction among the plurality of second shape-memory members 72-1 and 72-2.

For example, it is assumed that two first shape-memory members 71-1 and 71-2 and two second shape-memory members 72-1 and 72-2 are provided. The button pushing-out and button returning may be repeatedly performed by performing first control and second control. The first control is performed as follows. Electric current is supplied to one 72-1 of the two second shape-memory members 72-1 and 72-2 to move the operation module 10 to the second position (button pushing-out). Then, electric current supplied to one of the two second shape-memory members 72-1 and 72-2 is blocked. Thereafter, electric current is supplied to one 71-1 of the two first shape-memory members 71-1 and 71-2 to move the operation module 10 to the first position (button returning). Then, electric current supplied to one 71-1 of the two first shape-memory members 71-1 and 71-2 is blocked. The second control is performed as follows. When it is determined that one 72-1 of the two second shape-memory members 72-1 and 72-2 is not restored to be reusable, electric current is supplied to one 72-2 to move the operation module to the second position (button pushing-out). Then, electric current supplied to one 72-2 of the two second shape-memory members 72-1 and 72-2 is blocked. When it is determined that one 71-1 of the two first shape-memory members 71-1 and 71-2 is not restored to be reusable, electric current is supplied to one 71-2 to move the operation module to the first position (button returning). Then, electric current supplied to one 71-2 of the two first shape-memory members 71-1 and 71-2 is blocked.

Here, the cycle time may be used to determine whether the shape-memory member is restored to be reusable. After power supplied to the shape-memory member is blocked, the controller may count the cycle time for a shape-memory member and a determination time set to be longer than the cycle time. Then, when the determination time has not elapsed, the controller may determine that the shape-memory member is not restored to be reusable.

FIGS. 14 to 27 illustrate a configuration and operation of an in-vehicle operating device according to a third exemplary embodiment. Referring to FIGS. 14 to 27, the in-vehicle operating device according to the third exemplary embodiment has the same configuration and operation as the in-vehicle operating device according to the first exemplary embodiment except for the operation module assembly 5, so a redundant description of the same configuration will be omitted.

Figure 26:
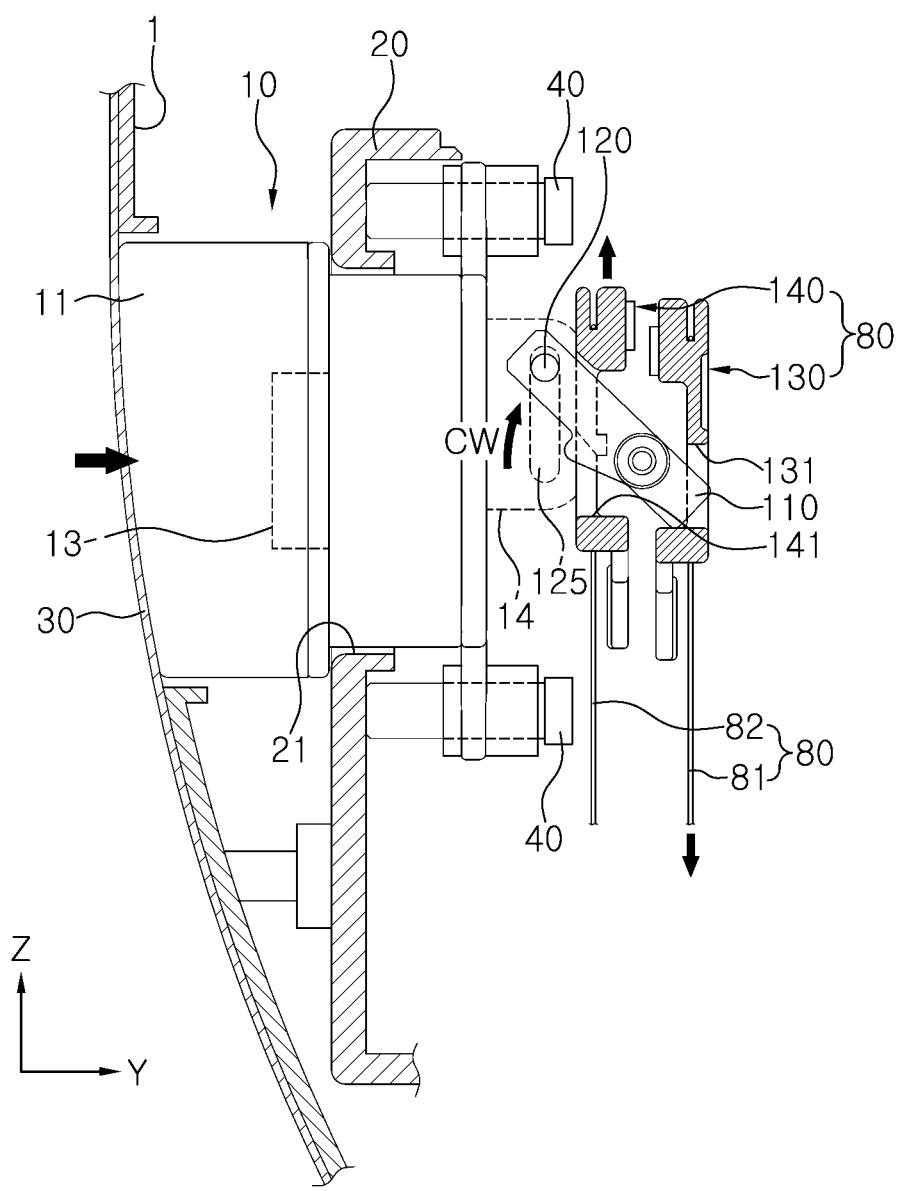
FIGS. 26 and 27 are perspective views each illustrating operation of the in-vehicle operating device according to the third exemplary embodiment.
Figure 27:
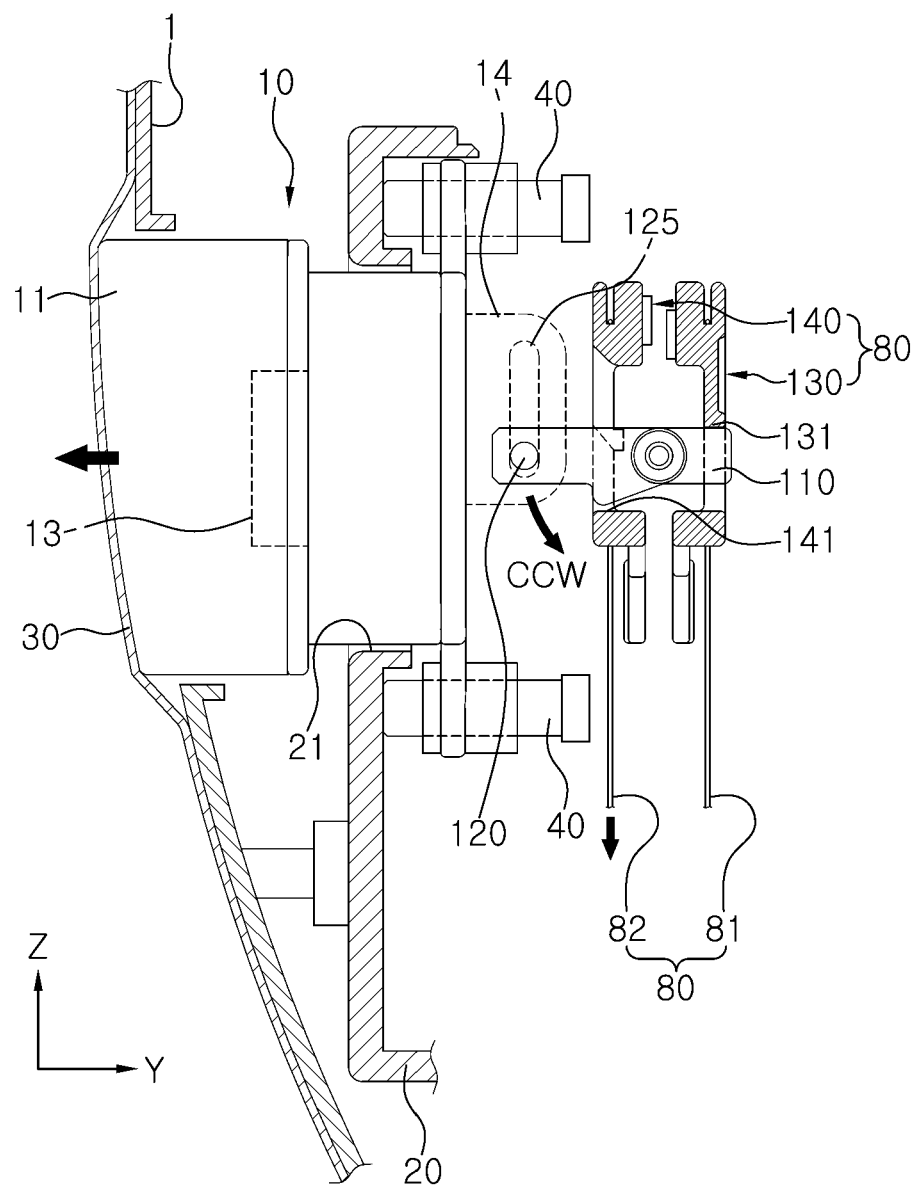

The in-vehicle operating device according to the third exemplary embodiment includes the operation panel 1, the operation module 10, the base 20, the base cover 25, and the finishing skin 30. Referring to FIGS. 26 and 27, a portion covering the button 11 for the operation module 10 of the flat-shaped finishing surface provided by the finishing skin 30 is pushed out or pull back by the button 11. The operation module 10 is provided in the state of being inserted into the passing-through area 21 of the base 20 to be movable in the first direction (i.e., the Y-axis direction), that is, in the backward-forward direction through the opening 2 of the operation panel 1 between the first position (the position at which the button 11 is accommodated in the opening 2) and the second position (the position in which the button 11 is pushed out from the panel surface of the operation panel 1 forward than the first position) that are spaced apart from each other. As illustrated in FIG. 26, when the operation module 10 is positioned at the first position, the finishing skin 30 provides the flat-shaped finishing surface to hide the shape of the button 11. As illustrated in FIG. 27, when the operation module 10 is moved to the second position to push out the button 11 from the panel surface of the operation panel 1, the portion covering the button 11 of the finishing skin 30 may be deformed to be pushed out of the panel surface by the button 11 so that the shape of the button 11 may appear visually conspicuous.

The operation module assembly 5 may further include a driving device for moving the operation module 10 in the Y-axis direction to be positioned at the first position or the second position.

The driving device includes an actuator 80 providing a driving force for moving the operation module 10. The driving device includes a rotation lever 110, the actuator 80, and a cam mechanism. The rotation lever 110 is provided behind the operation module 10 to be rotatable about an axis in the second direction intersecting the Y-axis direction. The actuator 80 rotates (reciprocating angular motion) the rotation lever 110 within a predetermined angle range around an axis in the second direction. The cam mechanism converts an angular motion of the rotation lever 110 by the actuator 80 into a linear motion in the Y-axis direction and transfers the resulting motion to the operation module 10.

The second direction is a left-right direction perpendicular to the Y-axis direction, that is, the backward-forward direction. Alternatively, the second direction (i.e., the X-axis direction) may be an upward-downward direction (i.e., Z-axis direction) perpendicular to the Y-axis direction.

The cam mechanism includes a cam element having a guidance path 125 and a cam pin 120. The cam pin 120 is connected to the guidance path 125. The cam mechanism may be configured to provide the cam element and the cam pin 120 to the operation module 10 and the rotation lever 110, respectively, to move the operation module 10 to the first position or the second position according to an angular motion direction of the rotation lever 110. Alternatively, the cam element and the cam pin 120 may be provided to the rotation lever 110 and the operation module 10, respectively, to move the operation module 10 to the first position or the second position according to the angular motion direction of the rotation lever 110.

Figure 22:
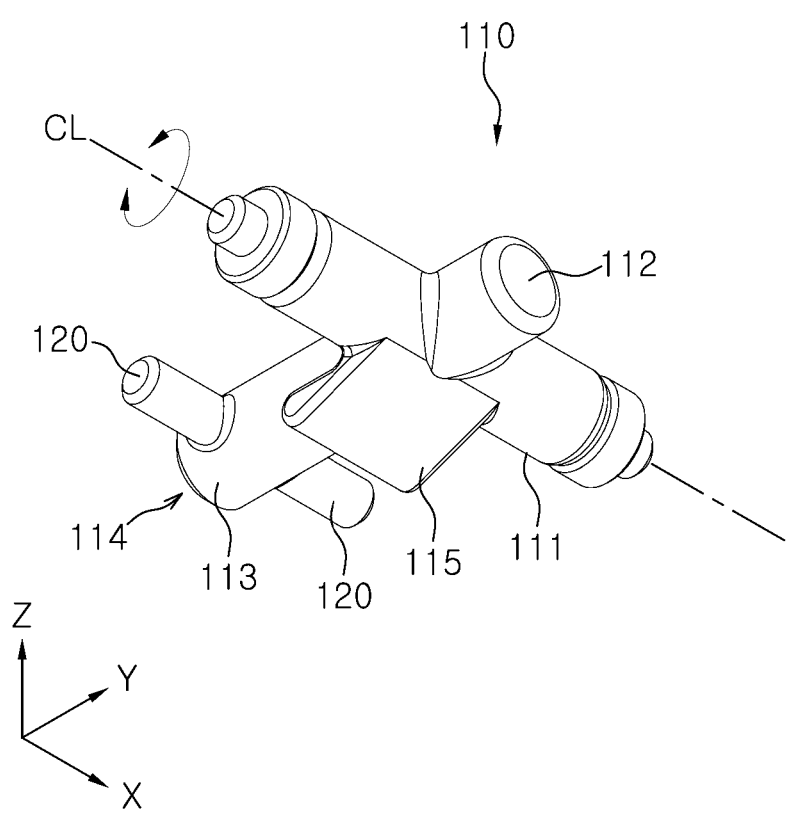
FIG. 22 is a perspective view illustrating a rotation lever illustrated in FIGS. 20 and 21.

Referring to FIG. 22, the rotation lever 110 includes an axis member 111, a first lever member 112, and a second lever member 113. The axis member 111 provides an axis in the X-axis direction. The first lever member 112 and the second lever member 113 are respectively arranged on both sides of the axis member 111 with the center line (CL) of the axis member 111 interposed therebetween. The first lever member 112 is arranged in the rear side in the Y-axis direction, and the second lever member 113 is arranged in the front side in the Y-axis direction. The axis member 111 extends in the X-axis direction. The second lever member 113 has a rotation end portion 114. When the rotation lever 110 angularly moves in the X-axis direction around the axis member 111, the rotation end portion 114 reciprocates between a third position and a fourth position that is located in front of the third position.

Figure 18:
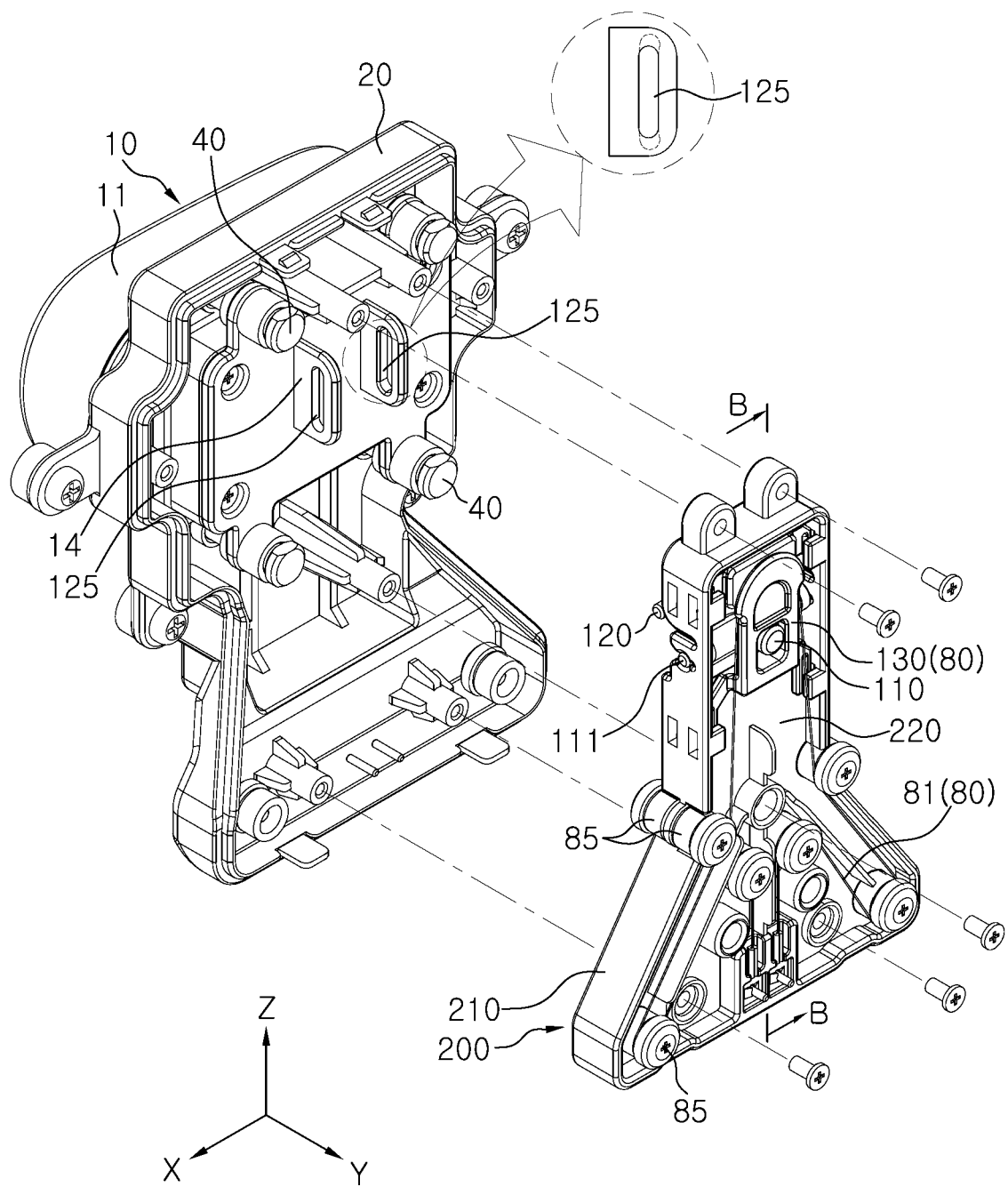

The cam pin 120 is provided on the rotation end portion 114 of the second lever member 113 and is arranged in the X-axis direction. A pair of cam pins 120 may protrude in the X-axis direction from both sides of the rotation end portion 114 in the X-axis direction. Referring to FIGS. 18, 26 and 27, two brackets 14 are provided on the rear portion of the operation module 10. The two bracket 14 oppose both sides of the rotation end portion 114 in the X-axis direction, respectively. The rotation end portion 114 of the second lever member 113 is arranged between the two brackets 14. Each of the two brackets 14 is provided with the cam element having the guidance path 125. The pair of cam pins 120 are respectively arranged to be inserted into the guidance paths 125. The two brackets 14 are respectively connected to the pair of cam pins 120.

The guidance path 125 is formed to have the form of a straight line extending in the third direction (i.e., the Z-axis direction) perpendicular to a plane including the Y-axis direction (i.e., the first direction) and the X-axis direction (i.e., the second direction). Thus, when the rotation end portion 114 of the rotation lever 110 is positioned at the third position, the operation module 10 is moved to the first position by operation with the cam pin 120. Further, when the rotation end portion 114 of the rotation lever 110 is positioned at the fourth position that is forward than the third position, the operation module 10 is moved to the second position by the operation with the cam pin 120.

When the rotation end portion 114 of the rotation lever 110 is moved to the third position and thus the operation module 10 is positioned at the first position, the cam pin 120 is arranged in an upper section in the Z-axis direction in the guidance path 125 that is straight in the Z-axis direction. In this state, when the rotation lever 110 is rotated counter-clockwise to move the rotation end portion 114 of the rotation lever 110 to the fourth position, the cam pin 120 moves along the guidance path 125 and is arranged on a lower section of the guidance path 125 in the Z-axis direction, and the operation module 10 is moved forward in the Y-axis direction by moving downward in the Z-axis direction on the guide path 125 of the cam pin 120. At this point, as illustrated in FIG. 27, the operation module 10 is moved to the second position, the button 11 is pushed out from the panel surface of the operation panel 1, and the portion covering the button 11 of the finishing skin 30 is deformed to be pushed out from the panel surface.

Thereafter, when the rotation lever 110 is rotated clockwise and thus the rotation end portion 114 of the rotation lever 110 is moved to the third position, the cam pin 120 is moved along the guidance path 125 and is arranged on the upper section of the guidance path 125 in the Z-axis direction, and the cam pin 120 is moved to the upper section of the guidance path 125 in the Z-axis direction. Thus, the operation module 10 is moved backward in the Y-direction. At this point, as illustrated in FIG. 26, the operation module 10 is moved (returned) to the first position, the surface of the button 11 is placed in the same plane as the panel surface of the operation panel 1, and the finishing skin 30 is restored to the original state thereof to provide the flat finishing surface.

With the configuration in which the guidance path 125 of the cam element has a straight shape in the Z-axis direction, although a position of the rotation lever 110 is not fixed using a driving force of the actuator 80, a movement in the Y-axis direction of the operation module 10 positioned at the first position or the second position is blocked by the upper or the lower sections of the guidance path 125 having the form of a straight line in the Z-axis direction. Due to this blocking, the operation module 10 may stably stay at the first position or the second position without the driving force of the actuator 80. Thus, it is possible to save energy required to operate the actuator 80.

The actuator 80 is a shape-memory actuator including a first shape-memory member 81 and a second shape-memory member 82 that contract when heated. The first shape-memory member 81 and the second shape-memory member 82 are made of a shape-memory material such as shape-memory resin or shape-memory alloy (SMA). For example, the first shape-memory member 81 and the second shape-memory member 82 may be a wire made of shape-memory alloy.

The first shape-memory member 81 applies a force generated when contracting to the first lever member 112 from the lower side of the upper and lower sides in the Z-axis direction to rotate the rotation lever 110 clockwise. The second shape-memory member 82 applies the force generated when contracting to the second lever member 113 from the lower side of the upper and lower sides in the Z-axis direction to rotate the rotation lever 110 counterclockwise. In this manner, the actuator 80 rotates the rotation level 110 in different directions while the first shape-memory member 81 and the second shape-memory member 82 contract. For example, at least one or both of the first shape-memory member 81 and the second shape-memory member 82 may rotate the rotation lever 110 when contracted to the upper side of the upper and lower sides in the Z-direction.

A mounting frame 200 is arranged behind the operation module 10. Referring to FIGS. 17 to 21, the mounting frame 200 is accommodated in the accommodation space between the base 20 and the base cover 25. The mounting frame 200 has a first arrangement space 201 and a second arrangement space 202. The first shape-memory member 81 is arranged in the first arrangement space 201, and the second shape-memory member 82 is arranged in the second arrangement space 202. The first arrangement space 201 and the second arrangement space 202 are arranged in a row in the Y-axis direction. The first arrangement space 201 is arranged behind the second arrangement space 202.

The mounting frame 200 includes a frame main body 210 and a barrier 220. The frame main body 210 has a structure that surrounds the first arrangement space 201 and the second arrangement space 202 which are arranged in a row. The barrier 220 divides an internal space of the frame main body 210 into the first arrangement space 201 and the second arrangement space 202.

The barrier 220 may be configured to provide thermal insulation. The first shape-memory member 81 and the second shape-memory member 82 in the contracted state may be reused after being cooled to a predetermined temperature or less and restored to their original shapes. During cooling after heating one of the first shape-memory member 81 and the second shape-memory member 82, when the other one is heated, the cooling speed of the previously heated shape-memory member may be reduced by heat generated from the other one. However, it is possible to minimize the problem of lowering the cooling speed by blocking thermal transfer by the barrier 220. In addition, the blocking of thermal transfer can optimize cycle times for reuse of the first shape-memory member 81 and the second shape-memory member 82.

Specifically, the cycle times for reuse of the first shape-memory member 81 and the second shape-memory member 82 may be optimized with a configuration in which the movement of the operation module 10 in the Y-axis direction is restricted at the first position and the second position by the upper section and the lower section of the linear guidance path 125 in the Z-axis direction, respectively. With this configuration, when the operation module 10 is moved to the first position, the current supply to the first shape-memory member 81 is immediately blocked, and when the operation module 10 is moved to the second position, the current supply to the second shape-memory member 82 is immediately blocked. Thus, the cycle times for the first shape-memory member 81 and the second shape-memory member 82 may be secured based on a point in time when the operation module 10 is no longer moved between the first position and the second position.

For example, the upper section and the lower section of the guidance path 125 are formed to extend to have a length in the Z-axis direction to form an additional space. Consequently, the cam pin 120 may be adaptively moved according to a contract length of the first shape-memory member 81 and the second shape-memory member 82. Accordingly, the cam pin 120 may enter the additional space according to the contract length of the first shape-memory member 81 and the second shape-memory member 82. For example, when the first shape-memory member 81 is contracted larger than an estimated contract length, the cam pin 120 may enter the additional space communicating with the upper section of the guidance path 125 via the upper section of the guidance path 125. Alternatively, when the second shape-memory member 82 is contracted by an estimated contract length, the cam pin 120 may be positioned in the lower section of the guidance path 125 without entering the additional space communicating with the lower section of the guidance path 125. The additional space of the guide path 125 may not be formed to extend in the Z-axis direction, but may be formed to extend along an arc-shaped trace of the cam pin 120 centered on the axis member 111, as shown by a dotted line in FIG. 18.

The barrier 220 has a mounting space 205 in which the rotation lever 110 is arranged. For example, the mounting space 205 may have a hole shape passing through the barrier 220 in the Y-axis direction.

The rotation lever 110 is rotatably mounted in the mounting space 205 about the axis member 111, in a state in which the first lever member 112 protrudes toward the first arrangement space 201 and the second lever member 113 protrudes toward the second arrangement space 202. For example, the axis member 111 may be arranged on the second arrangement space 202, and both end portions thereof may be rotatably coupled to the frame main body 210.

Referring to FIGS. 17 to 21, 26 and 27, the actuator 80 may further include a first moving member 130 and a second moving member 140. The first moving member 130 is provided in the first arrangement space 201 reciprocally in the Z-axis direction, and the second moving member 130 is provided in the second arrangement space 202 reciprocally in the Z-axis direction. The first shape-memory member 81 is connected to the first moving member 130 to move the first moving member 130 downward along the Z-axis direction when contracted. The second shape-memory member 82 is connected to the second moving member 140 to move the second moving member 140 downward along the Z-axis direction when contracted. A first contact portion 131 is provided on the first moving member 130, and a second contact portion 141 is provided on the second moving member 140. The first contact portion 131 may be connected to the first lever member 112 of the rotation lever 110, and the second contact portion 141 may be connected to the second lever member 113 of the rotation lever 110.

When the first moving member 130 is moved downward along the Z-axis direction by the first shape-memory member 81, the first contact portion 131 of the first moving member 130 pushes the first lever member 112 of the rotation lever 110 to rotate the rotation lever 110 clockwise. When the rotary lever 110 is rotated counterclockwise by the second shape-memory member 82, the rotation lever 110 is pushed by the first lever member 112 to move the first moving member 130 upward in the Z-axis direction. The first moving member 130 may have an operation hole penetrating in the Y-axis direction. The first lever member 112 may be positioned in the operation hole of the first moving member 130. The first contact portion 131 may be arranged in an internal surface of an upper portion of the operation hole of the first moving member 130.

When the second moving member 140 is moved downward along the Z-axis direction by the second shape-memory member 82, the second contact portion 141 of the second moving member 140 pushes the second lever member 113 of the rotation lever 110 to rotate the rotation lever 110 counterclockwise. When the rotary lever 110 is rotated clockwise by the first shape-memory member 81, the rotation lever 110 is pushed by the second lever member 113 to move the second moving member 140 upward in the Z-axis direction. The second moving member 140 may have an operation hole penetrating in the Y-axis direction. The second lever member 113 may be positioned in the operation hole of the second moving member 140. The second contact portion 141 may be arranged in an internal surface of an upper portion of the operation hole of the second moving member 140 or in an internal surface of a lower portion thereof.

A distance between the first lever member 112 and the first contact portion 131 and a distance between and the second lever member 113 and the second contact portion 141 are set such that a moving distance of the first moving member 130 in the Z-axis direction and a moving distance of the second moving member 140 in the Z-axis direction according to an angular movement direction of the rotation lever 110 are equal to each other.

The first shape-memory member 81 is formed in a bent shape so that the first shape-memory member 81 is hung on a first hook portion 132 provided on an upper end of the first moving member 130. The second shape-memory member 82 is formed in a bent shape so that the second shape-memory member 82 is hung on a second hook portion 142 provided on an upper end of the second moving member 140. The first hook portion 132 and the second hook portion 142 may be provided in the shape of a groove in the first moving member 130 and the second moving member 140, respectively.

Figure 19:
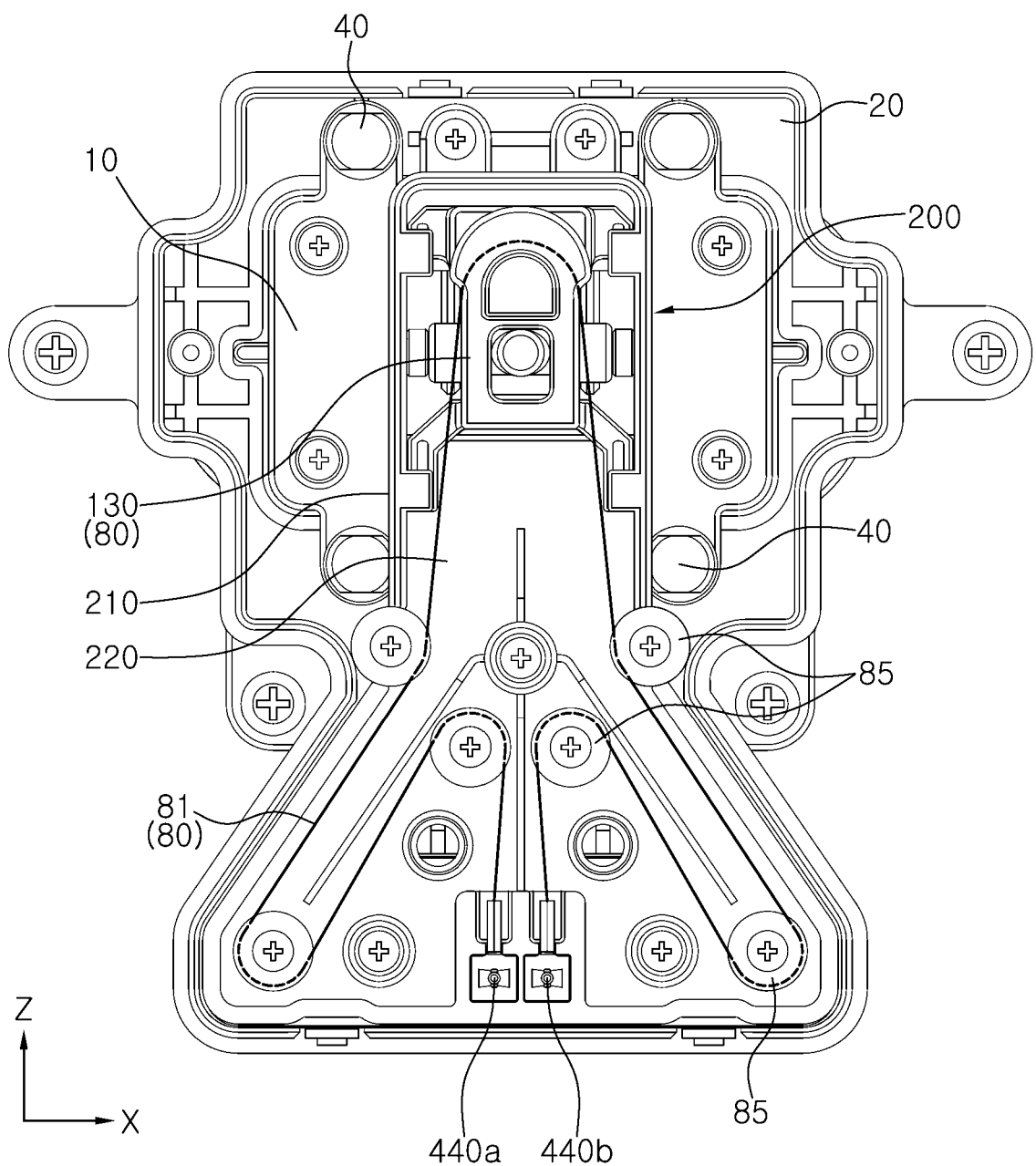
FIG. 19 is a rear view illustrating the operation module assembly illustrated in FIG. 18.

The first shape-memory member 81 and the second shape-memory member 82 are provided in the first arrangement space 201 and the second arrangement space 202, respectively, having a shape parallel to a plane formed in the X-direction (i.e., the second direction) and the Y-direction (i.e., the third direction). At least a portion between one end and the center of each of the first shape-memory member 81 and the second shape-memory member 82 is hung by at least one guidance members 85. Thus, the first shape-memory member 81 and the second shape-memory member 82 have at least one bent portion. The first shape-memory member 81 and the second shape-memory member 82 have at least one bent portion when hung on the guidance member 85. Accordingly, lengths of the first shape-memory member 81 and the second shape-memory member 82 can be greatly increased. Further, when the first shape-memory member 81 and the second shape-memory member 82 are contracted, a displacement due to length changes of the first shape-memory member 81 and the second shape-memory member 82 can be increased more greatly. FIG. 19 illustrates a case of bent portions of each of the first shape-memory member 81 and the second shape-memory member 82 when hung on the guide member 85, but it is understood that this is only an example and other exemplary embodiments are not limited thereto. For example, the first shape-memory member 81 and the second shape-memory member 82 may be variously deformed in such a way that the lengths thereof are increased in the plane formed in the X-axis direction (i.e., the second direction) and the Z-axis direction (i.e., the third direction).

Figure 25:
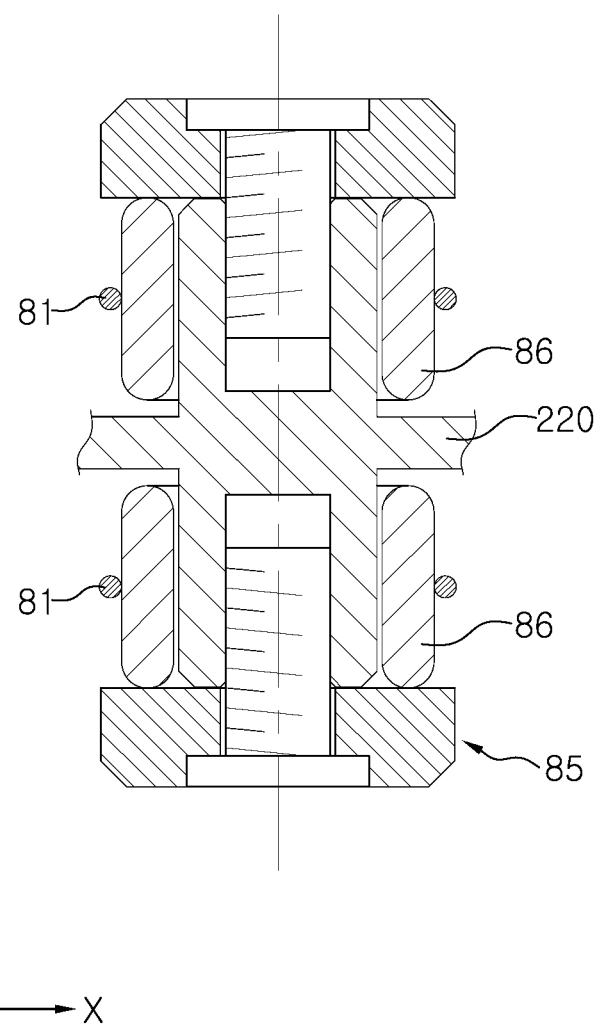
FIG. 25 is a cross-sectional view illustrating portion C of FIG. 20.

Referring to FIG. 25, the guidance members 85 provided on the mounting frame 200 may include rolling elements 86. The rolling elements 86 serve to reduce friction generated between the first shape-memory member 81 and the second shape-memory member 82 when the first shape-memory member 81 and the second shape-memory member 82 contract. Examples of the rolling element 86 include a roller, a wheel, a bearing, and the like that are rotatable about an axis in the Y-axis direction.

Figure 20:
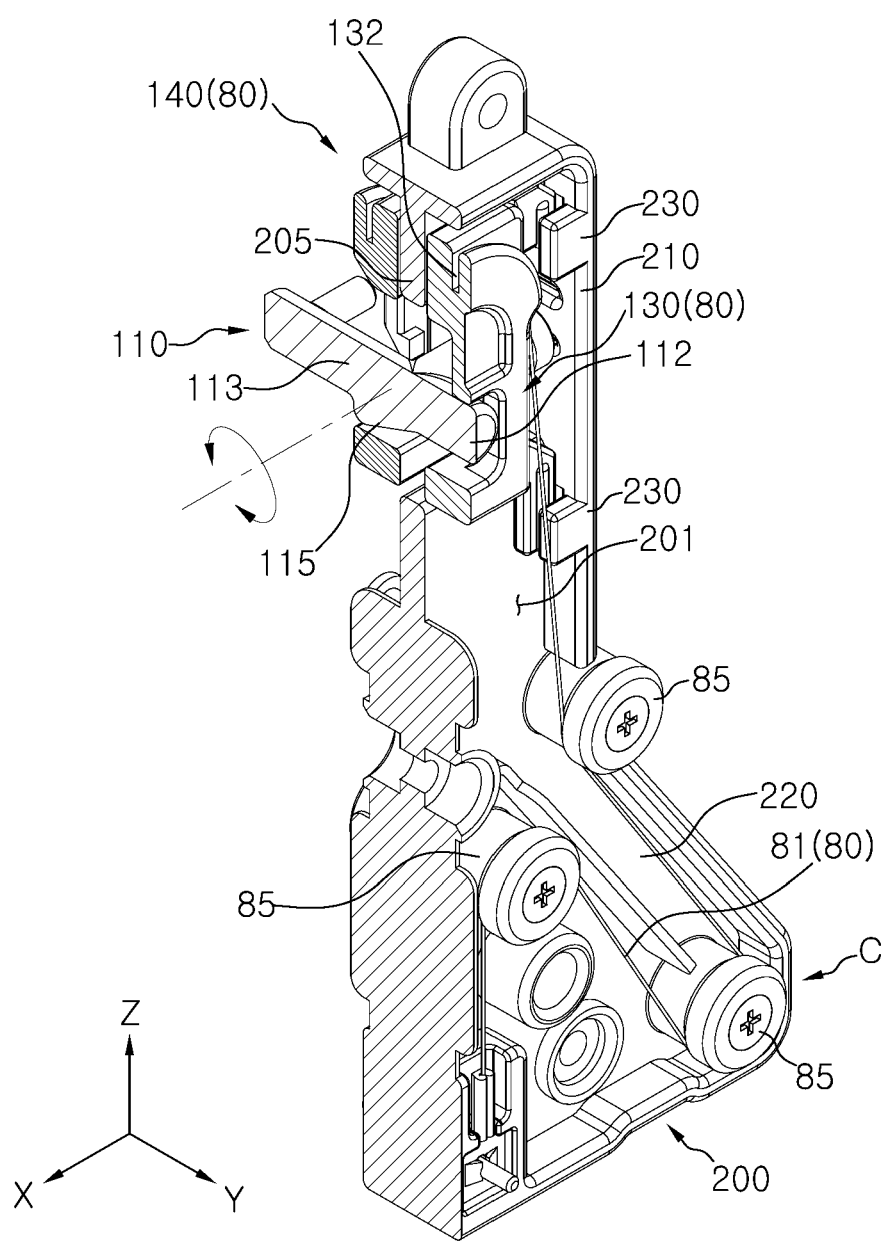
FIGS. 20 and 21 are perspective cross-sectional views taken along line B-B of FIG. 18 when viewed from different directions.
Figure 21:
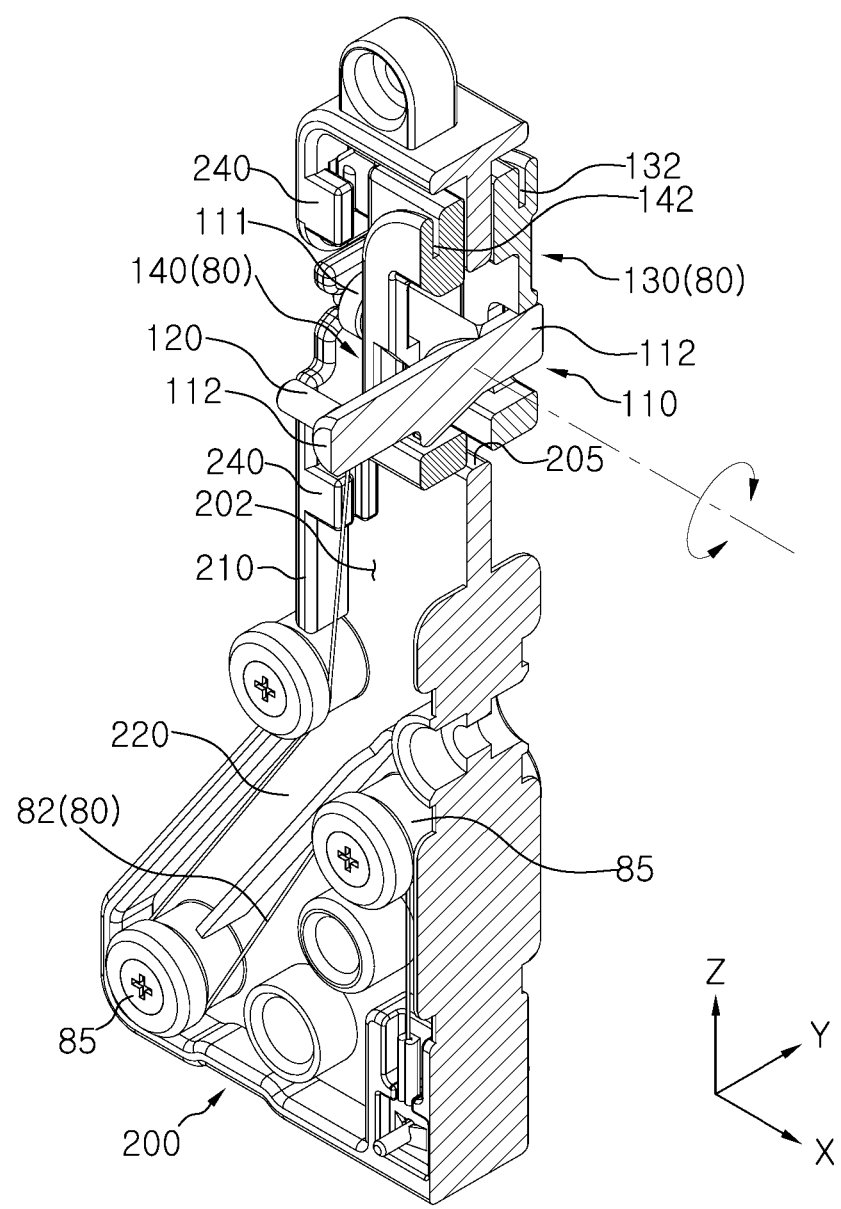
Figure 23:
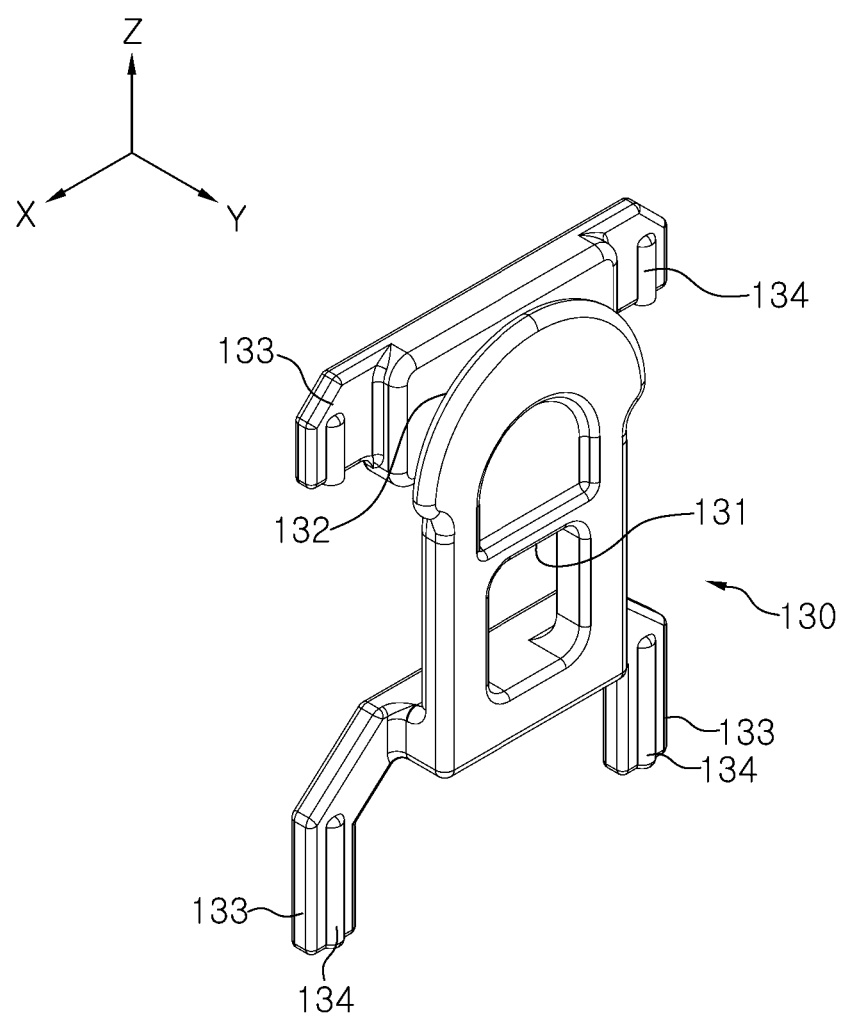
FIG. 23 is a perspective view illustrating a first moving member illustrated in FIGS. 20 and 21.

Referring to FIGS. 20, 21, and 23, first guidance wings 133 are provided on both sides of the first moving member 130 in the X-direction, respectively. The mounting frame 200 has a first covering member 230. The first covering member 230 provides guidance paths in which the first guidance wings 133 on both sides of the first moving member 130 are slidably inserted in the Z-axis direction between the mounting frame 200 and the barrier 220 in the first arrangement space 201. The first moving member 130 may be precisely moved in the Z-direction through the guidance paths between the barrier 220 and the first covering members 230 and the first guidance wings 133 inserted into the guidance paths. The first covering members 230 may be connected to the frame main body 210.

The pair of first guidance wing 133 and the first covering member 230 may be configured to be in linear or point contact with each other, thereby reducing friction due to sliding. For example, as illustrated in FIG. 23, a contact portion 134 in contact with the first covering member 230 of the first guidance wing 133 may be formed in a semicircular shape with a convex horizontal cross-section. Thus, the first guidance wing 133 may be in linear contact with the first covering member 230. The contact portion 134 in contact with the first covering member 230 may be formed to have a convex spherical surface. Thus, the first guidance wing 133 may be in point contact with the first covering member 230.

Figure 24:
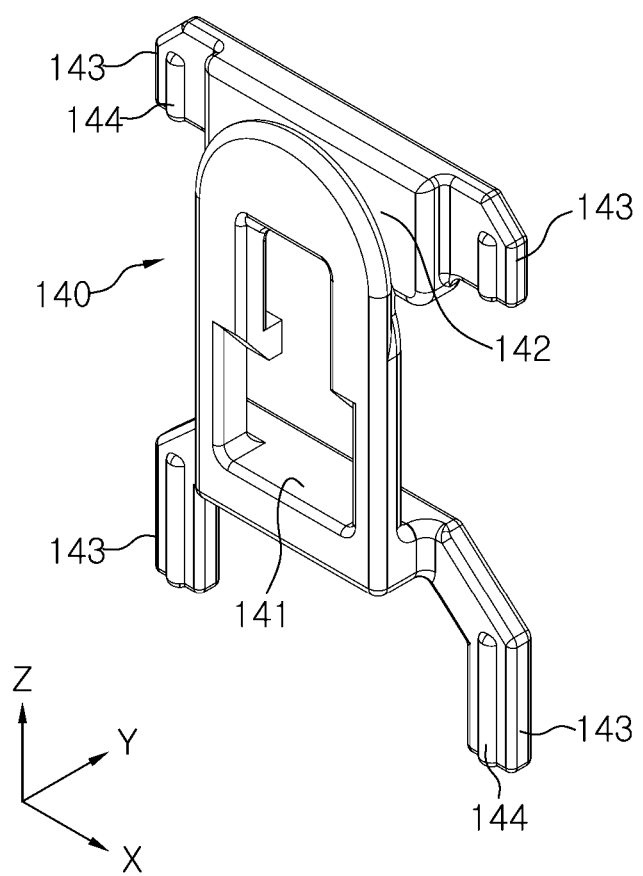
FIG. 24 is a perspective view illustrating a second moving member illustrated in FIGS. 20 and 21.

Referring to FIGS. 20, 21, and 24, second guidance wings 143 are provided on both sides of the second moving member 140 in the X-direction, respectively. The mounting frame 200 has a second covering member 240. The second covering member 240 provides guidance paths in which the second guidance wings 143 on both sides of the second moving member 140 are slidably inserted between the mounting frame 200 and the barrier 220 in the second arrangement space 202. The second moving member 140 may be precisely moved in the Z-direction through the guidance paths between the barrier 220 and the second covering members 240 and the second guidance wings 143 inserted into the guidance paths. The second covering members 240 may be connected to the frame main body 210.

The pair of second guidance wing 143 and the second covering member 240 may be configured to be in linear or point contact with each other, thereby reducing friction due to sliding. For example, as illustrated in FIG. 24, a contact portion 144 in contact with the second covering member 240 of the second guidance wing 143 may be formed in a semicircular shape with a convex horizontal cross-section. Thus, the second guidance wing 143 may be in linear contact with the second covering member 240. The contact portion 144 in contact with the second covering member 240 may be formed to have a convex spherical surface. Thus, the second guidance wing 143 may be in point contact with the second covering member 240.

The in-vehicle operating device according to the third exemplary embodiment may further include a sensor and a controller. The sensor detects the user's motion for operating the button 11. The controller controls operation of the operation module 10 and operation of the driving device based on a detection signal from the sensor. The sensor and the controller have the same configuration as those of the first exemplary embodiment, so a redundant description will be omitted.

Figure 28:
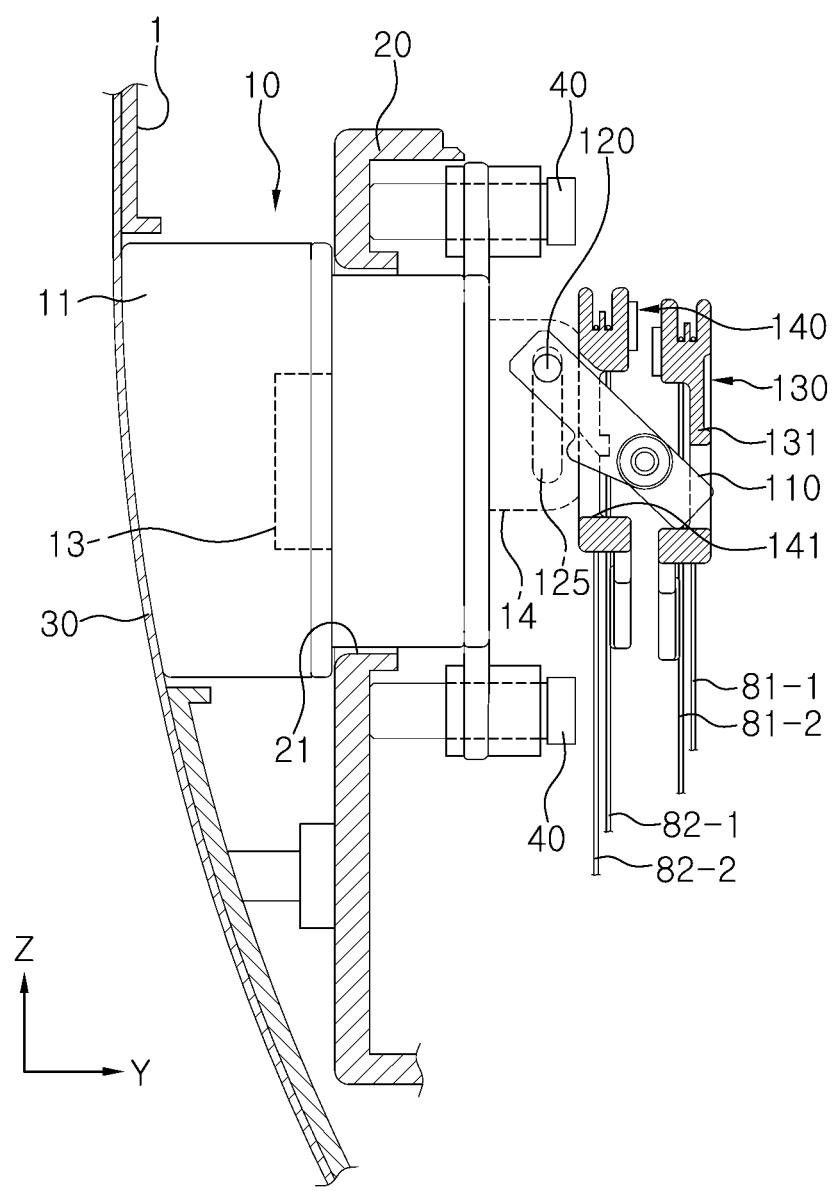
FIG. 28 is a perspective view illustrating main elements of an in-vehicle operating device according to a fourth exemplary embodiment.

FIG. 28 is a perspective view illustrating main elements of an in-vehicle operating device according to a fourth exemplary embodiment. Referring to FIG. 28, the in-vehicle operating device according to the fourth exemplary embodiment have the same configuration and operation as those of the third exemplary embodiment except for a plurality of first shape-memory members 81-1 and 81-2 and a plurality of second shape-memory members 82-1 and 82-2, so a redundant description of the same configuration will be omitted. Here, the controller is configured to individually control the plurality of first shape-memory members 81-1 and 81-2 and the plurality of second shape-memory members 82-1 and 82-2. The plurality of first shape-memory members 81-1 and 81-2 and the plurality of second shape-memory members 82-1 and 82-2 provide a driving force for a reciprocating angular motion of the rotation lever 110 to the rotary lever 110.

The plurality of first shape-memory members 81-1 and 81-2 may be disposed at a distance from each other in the Y-axis direction to be connected to the first moving member 130, in a state in which the plurality of first shape-memory members 81-1 and 81-2 are respectively hung from the upper end of the first moving member 130 to the first hook portions 132 spaced apart from each other by a predetermined distance. The plurality of second shape-memory members 82-1 and 82-2 may be disposed at a distance from each other in the Y-axis direction to be connected to the second moving member 140, in a state in which the plurality of second shape-memory members 82-1 and 82-2 are respectively hung from the upper end of the second moving member 140 to the second hook portions 142 spaced apart from each other by a predetermined distance. A plurality of the first hook portions 132 on the upper end of the first moving member 130 may be provided such that the plurality of first shape-memory members 81-1 and 81-2 are hung on the plurality of the first hook portions 132, respectively. A plurality of the second hook portions 142 on the upper end of the second moving member 140 may be provided such that the plurality of second shape-memory members 82-1 and 82-2 are hung on the plurality of the second hook portions 142, respectively.

Under the control of the controller, when the plurality of first shape-memory members and 81-1 and 81-2 receive electric current and are contracted, the rotation lever 110 is rotated clockwise by a predetermined angle about the axis in the X-axis direction to move the rotation module 10 to the first position (button returning). Under the control of the controller, when the plurality of second shape-memory members and 82-1 and 82-2 electric current and are contracted, the rotation lever 110 is rotated counterclockwise by a predetermined angle about the axis in the X-axis direction to move the rotation module 10 to the second position (button pushing-out).

The controller moves the operation module 10 to the first position by controlling one or more members selected from among the plurality of first shape-memory members 81-1 and 81-2. Also, the controller moves the operation module 10 to the second position by controlling one or more members selected from among the plurality of second shape-memory members 82-1 and 82-2.

For example, the controller may move the operation module 10 to the first position by alternately controlling the plurality of first shape-memory members 81-1 and 81-2. Also, the controller may move the operation module 10 to the second position by alternately controlling the plurality of second shape-memory members 82-1 and 82-2. For example, the controller may move the operation module 10 to the first position by controlling the first shape-memory member which is restored to be reusable after contraction among the plurality of first shape-memory members 81-1 and 81-2. Also, the controller may move the operation module 10 to the second position by controlling the second shape-memory member which is restored to be reusable after contraction among the plurality of second shape-memory members 82-1 and 82-2.

As described above, the control of the operation of the various in-vehicle operating devices according to one or more exemplary embodiments is performed by the controller. A controller described below is the same as the controller of FIG. 6.

For example, operating conditions for reliable operation of the shape-memory member may be imposed. When a voltage, electric current, or the like that exceeds an operating condition range is applied to the shape-memory member, high stress or deformation occurs. Thus, the performance of the shape-memory member is deteriorated, and the lifetime thereof is reduced accordingly. In detail, when a voltage, electric current, or the like that exceeds a predetermined level is applied, the shape-memory member is permanently deformed and cannot be restored to its original shape, or the shape-memory member itself is damaged. Therefore, a technique of performing control for maintaining stable operation of the shape-memory member of the actuator according to one or more exemplary embodiments is proposed.

Moreover, an operational feature of the shape-memory member varies depending on an environmental condition, particularly a temperature condition. Temperature is directly related to current density. Therefore, for consistent operation of the actuator, it is necessary to precisely control electric current supplied to the shape-memory member of the actuator according to temperature. Therefore, a technique of controlling electric current applied to the shape-memory member of the actuator depending on the environmental condition according to one or more exemplary embodiments is proposed.

Figure 29:
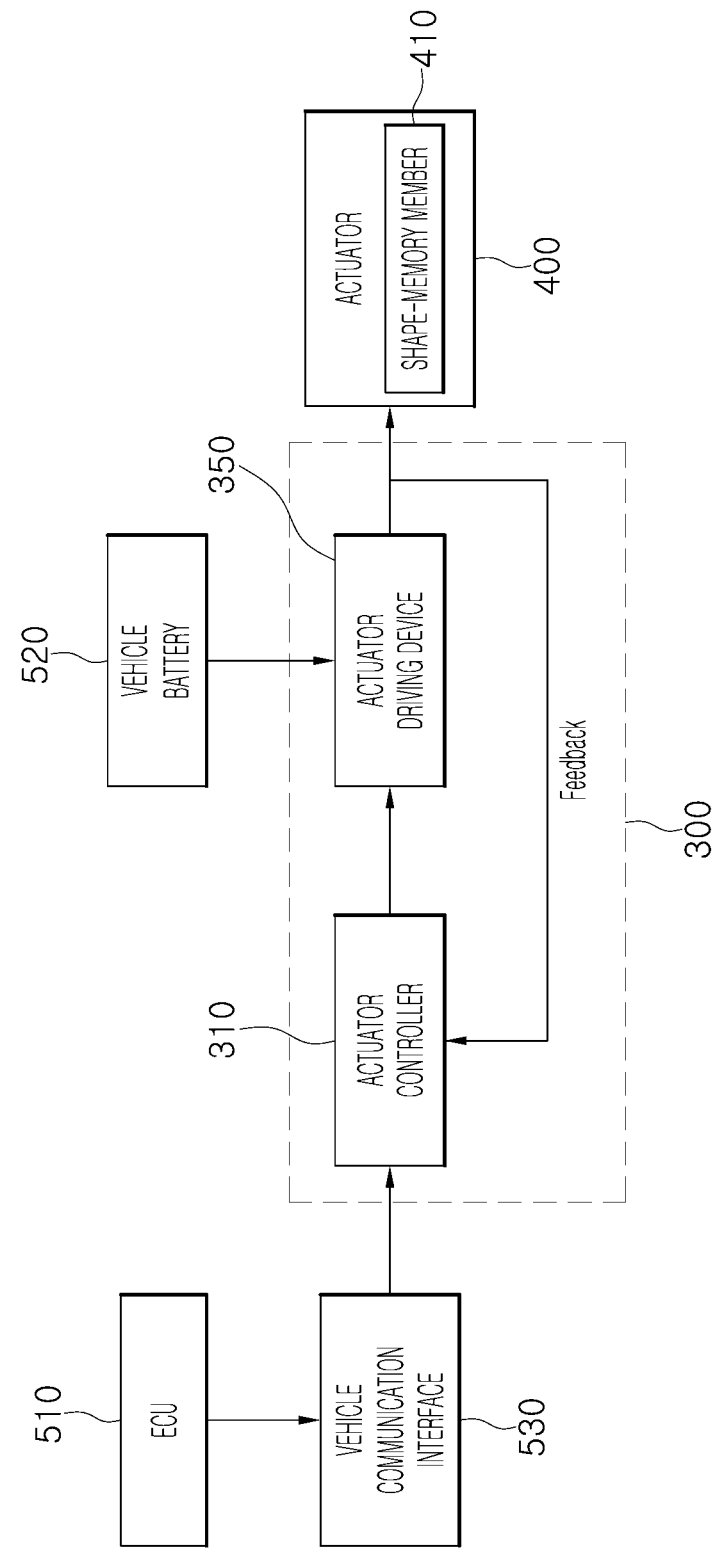
FIG. 29 is a view illustrating a configuration of an implementation example of a controller of the in-vehicle operating device according to an exemplary embodiment.

FIG. 29 is a view illustrating a configuration of an implementation example of the controller of the in-vehicle operating device according to an exemplary embodiment.

Referring to FIG. 29, a controller 300 supplies electric current to a shape-memory member 410 of the actuator 400 to operate the actuator 400. The controller 300 supplies electric current to the actuator 400 while maintaining a voltage provided from a vehicle battery 520 within a preset voltage range. For example, the controller 300 operates the actuator 400 by controlling an amount of electric current according to operating conditions of the shape-memory member 410.

To this end, the controller 300 may include an actuator controller 310 and an actuator driving device 350.

The actuator controller 310 transfers a control signal for controlling an amount of electric current to the actuator 410 according to the condition for operating the shape-memory member 410 to the actuator driving device 350.

Then, the actuator driving device 350 supplies electric current to the actuator 400 according to the control signal of the actuator controller 310 while maintaining a voltage provided from the vehicle battery 520 within a preset voltage range.

In order to supply electric current to the actuator, end portions on one side or both sides of the shape-memory member of the actuator are connected to electric terminals. For example, referring to FIGS. 9 and 10, a pair of terminals 420a and 420b and a pair of terminals 430a and 430b are provided on two mounting blocks 52 of the second guide 50, respectively. End portions of the U-shaped first shape-memory member 71 are electrically connected to the pair of terminals 420a and 420b, respectively. End portions of the U-shaped second shape-memory member 72 are electrically connected to the pair of terminals 430a and 430b, respectively. The first shape-memory member 71 and the second shape-memory member 72 receive electric current from the upper pair of terminals 420a and 420b and the lower pair of terminals 430a and 430b, respectively.

In addition, the actuator driving device 350 measures electric current supplied to the actuator 400 and provides a value of the measured electric current to the actuator controller 310. The actuator controller 310 compares the value of the measured electric current with a reference amount of electric current to determine whether an amount of supplied electric current complies with the condition for operating the shape-memory member 410 and computes an appropriate correction value for the supplied electric current. Then, the actuator controller 310 controls the actuator driving device 350 so that corrected electric current is supplied.

Moreover, the actuator controller 310 is provided with environmental information, such as vehicle temperature, to determine whether to comply with environmental conditions. The actuator controller 310 may receive various types of sensing information from an electronic control unit (ECU) 510 or may receive various types of environmental information from various sensors mounted in a vehicle. Here, a vehicle communication interface 530 installed in the vehicle transmits and receives the environmental information. For example, an in-vehicle communication network using the same communication protocol as a controller area network (CAN) may be used.

The actuator controller 310 may correct an amount of electric current to be supplied to the shape-memory member 410 of the actuator 400 based on various environmental information such as temperature information in the vehicle.

The controller according to the exemplary embodiment may be configured to control the supply of electric current to the actuator including a single shape-memory member, but preferably the controller may be configured to control the supply of electric current to the actuator including a plurality of shape-memory members.

Figure 30:
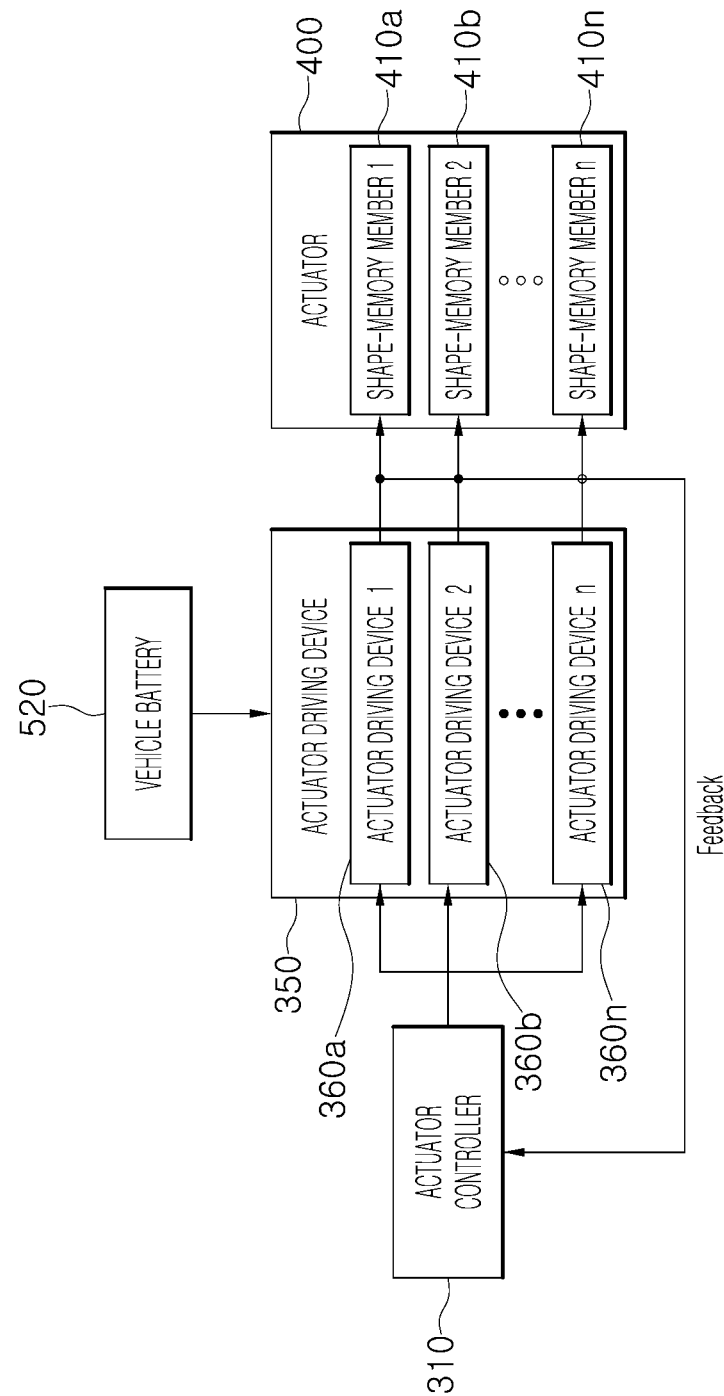
FIG. 30 is a view illustrating a configuration of another implementation example of the controller of the in-vehicle operating device according to an exemplary embodiment.

Referring to FIG. 30, the actuator 400 of the in-vehicle operating devices according to one or more exemplary embodiments may include a plurality of shape-memory members 410a, 410b, and 410n. For example, the actuator 400 may include one or more first shape-memory members and one or more second shape-memory members. The first shape-memory member moves the operation module to the first position by using a force generated during contraction. The second shape-memory member moves the operation module to the second position by using a force generated during contraction.

In supplying electric current to the plurality of shape-memory members 410a, 410b, and 410n included in the actuator 400, a single actuator driving device may selectively supply electric current to the plurality of shape-memory members 410a, 410b, and 410n, but preferably a plurality of actuator driving devices 360a, 360b, and 360n for supplying electric current to each of the plurality of shape-memory members 410a, 410b, and 410n included in the actuator 400 may be provided.

The actuator controller 310 may individually transfer control signals to the actuator driving devices 360a, 360b, and 360n respectively corresponding to the shape-memory members 410a, 410b, and 410n, in order to individually control the shape-memory members 410a, 410b, and 410n included in the actuator 400.

In addition, the actuator controller 310 may receive feedback on the electric current supplied to each of the plurality of actuator driving devices 360a, 360b, and 360n, and correct an amount of supplied electric current.

For example, the actuator controller 310 may transfer control signals to the actuator driving devices 360a, 360b, and 360n corresponding to the plurality of first shape-memory materials alternately or selectively for moving the operation module to the first position. Then, the corresponding actuator driving devices 360a, 360b, and 360c may alternately or selectively supply electric current to the first shape-memory material according to the control signals. In addition, the actuator controller 310 may transfer control signals to the actuator driving devices 360a, 360b, and 360n corresponding to the plurality of second shape-memory materials alternately or selectively for moving the operation module to the second position. Then, the corresponding actuator driving devices 360a, 360b, and 360c may alternately or selectively supply electric current to the second shape-memory material according to the control signals.

Moreover, the actuator controller 310 may generate control signals for alternately or selectively controlling the plurality of first shape-memory members and the plurality of second shape-memory members based on the cycle times restored to be reusable after contraction according to the supply of electric current to each of the plurality of first shape-memory members and the plurality of second shape-memory members. Then, the actuator controller 310 may transfer the generated control signal to the corresponding actuator driving devices 360a, 360b, and 360n.

Figure 31:
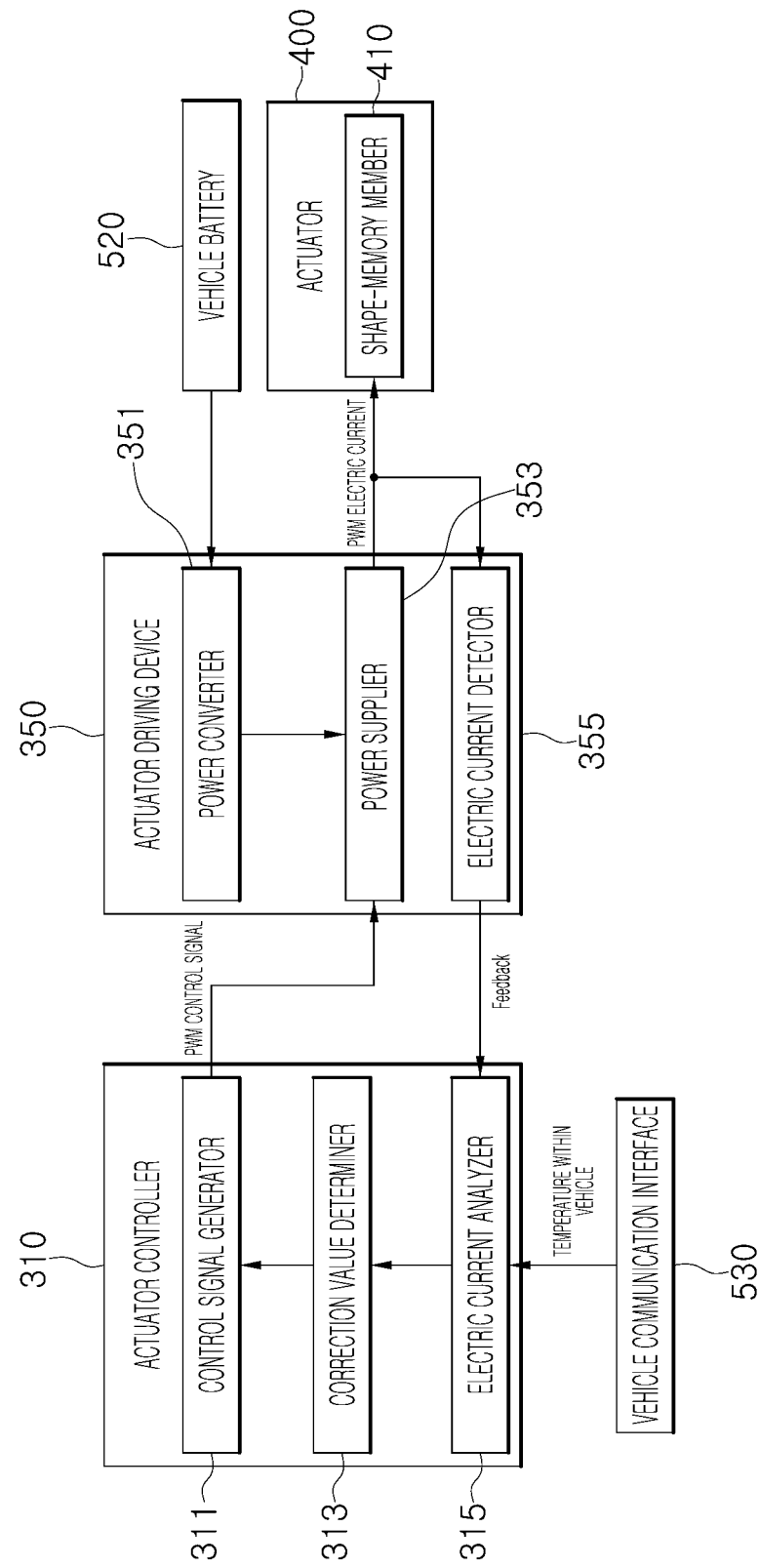
FIG. 31 is a view illustrating elements of the controller according to an exemplary embodiment.
Figure 33:
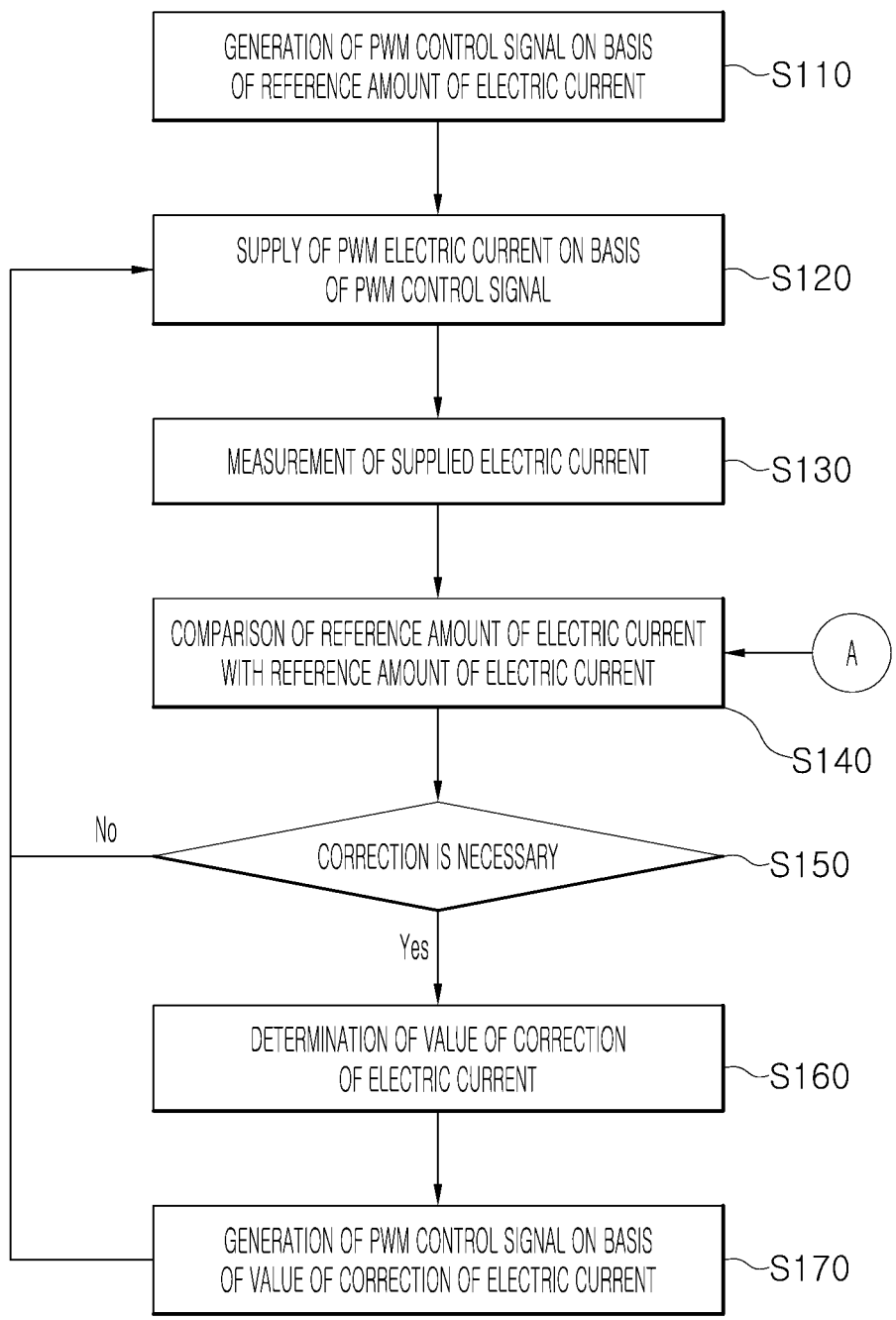
FIG. 33 is a flowchart for a method of controlling the in-vehicle operating device according to an exemplary embodiment.
Figure 34:
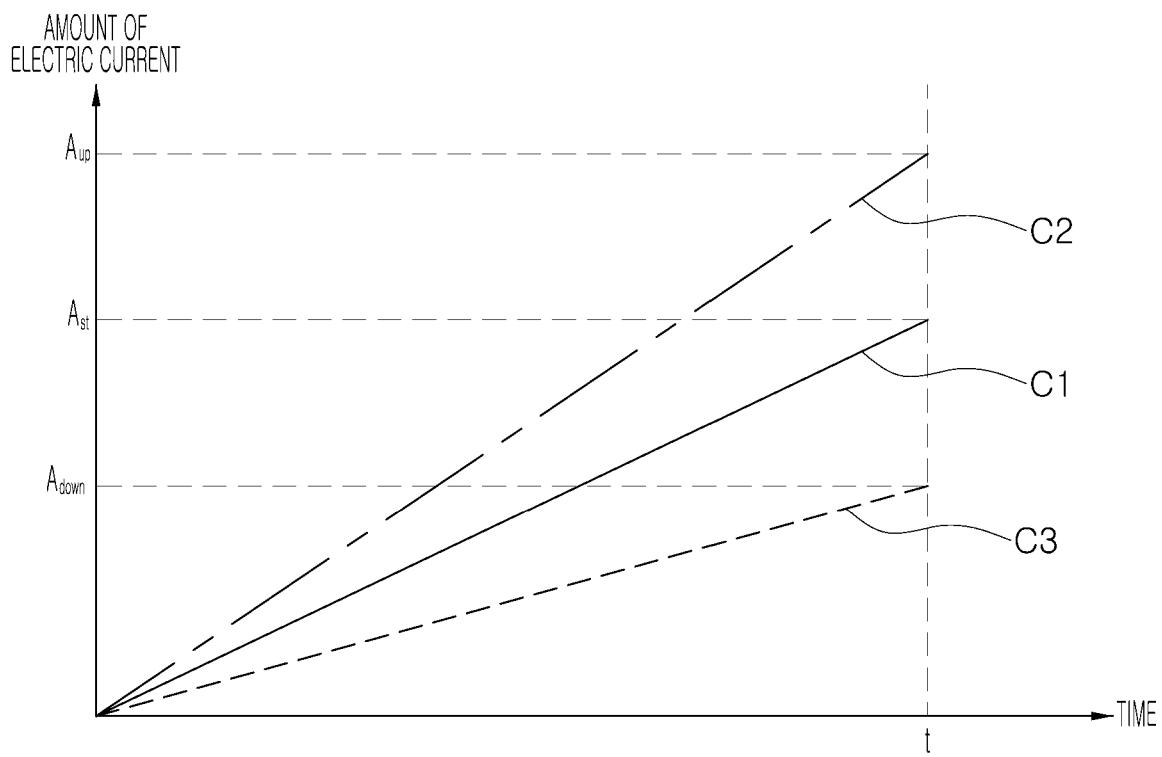
FIG. 34 is a view illustrating an implementation example of a reference amount of electric current and an amount of supplied electric current in the in-vehicle operating device according to the exemplary embodiment.

FIG. 31 is a view illustrating a detailed configuration of an implementation example of the controller according to the exemplary embodiment. FIG. 33 is a flowchart for a method of controlling the in-vehicle operating device according to an exemplary embodiment. FIG. 34 is a graph resulting from plotting an amount of electric current as a function of time. The detailed configuration of the controller and the method of controlling the in-vehicle operating device through the controller are described in detail with reference to FIGS. 31, 33, and 34.

Referring to FIGS. 31, 33, and 34, a control signal generator 311 of the actuator controller 310 generates a control signal for controlling the shape-memory member 410 of the actuator 400 and transfers the generated control signal to the actuator driving device 350.

Here, the control signal may be generated based on the condition for operating the shape-memory member. The control signal is explained with reference to an implementation example of the condition for operating the shape-memory member applied in the exemplary embodiment illustrated in FIG. 32. When a shape-memory member having a diameter of 0.001 inch and a resistance of 36.2 ohms is used, a condition S for operating the shape-memory member is that when a current of 45 mA is applied for one second, a tensile force of 8.9 grams is generated and the time to return to an original shape due to cooling takes 0.18 seconds at a temperature of about 70° C.

The control signal generator 311 generates the control signal according to the reference amount of electric current to comply with this condition for operating the shape-memory member. Preferably, the control signal generator 311 generates a PWM control signal (S110). For example, the control signal generator 311 includes a pulse generator and a PWM modulator. The control signal generator 311 generates the PWM control signal corresponding to the reference amount of electric current and transfers the generated PWM control signal to the actuator driving device 350.

A power converter 351 of the actuator driving device 350 converts a voltage provided from the vehicle battery into a preset voltage and maintains the voltage range to be supplied. For example, the vehicle battery provides a voltage of 9 to 16V, a sudden deformation occurs when a voltage of about 16 V is applied to the shape-memory member. In some circumstances, a permanent deformation of the shape-memory member may occur. In addition, when a non-uniform voltage in a range of 9 V to 16 V is applied, the deformation time of the shape-memory member varies depending on the applied voltage, so that consistent process operation cannot be ensured.

Therefore, according to the exemplary embodiment, the power converter 351 includes a DC-DC converter which supplies a voltage while maintaining the voltage provided from the vehicle battery within a predetermined range. For example, the power converter 351 converts a voltage of 9 to 16 V provided from the vehicle battery into a voltage of about 6 V with room for error and supplies the resulting voltage to a power supplier 353.

The power supplier 353 of the actuator driving device 350 converts power supply electric current provided from the power supplier 353 based on the PWM control signal from the control signal generator 311 and supplies the resulting PWM electric current to the shape-memory member 410 of the actuator 400 (S120). To this end, the power supplier 353 employs a switching configuration. The power supplier 353 converts an electric current signal into the PWM electric current signal base on the PWM control signal and supplies the resulting PWM electric current signal to the shape-memory member 410 of the actuator 400.

When the electric current is applied to the shape-memory member 410 of the actuator 400, the shape-memory member is deformed, and thus the actuator 400 moves the operation module.

In addition, the actuator driving device 350 includes an electric current detector 355. The electric current detector 355 measures electric current provided from the power supplier 353 to the shape-memory member 410 of the actuator 400 (S130).

The electric current measured by the electric current detector 355 of the actuator driving device 350 is fed back to the actuator controller 310. An electric current analyzer 315 of the actuator controller 310 receives the measured electric current and compares an amount of supplied electric current according to the measured electric current and the reference amount of electric current in compliance with the operating conditions (S140). The electric current analyzer 315 determines whether correction of the supplied electric current is necessary (S150).

When a difference between the amount of supplied electric current and the reference amount of electric current exceeds an upper limit of a predetermined acceptable error range, the electric current analyzer 315 of the actuator controller 310 determines that correction of the supplied electric current is necessary, and transfers the analysis result to the correction value determiner 313.

The correction value determiner 313 of the actuator controller 310 determines an electric current correction value based on the analysis result by the electric current analyzer 315 (S160). For example, the correction value determiner 313 may determine an electric current correction value of the amount of supplied electric current based on a value of the difference resulting from the comparison of the amount of supplied electric current with the reference amount of electric current.

The electric current correction value determined by the correction value determiner 313 of the actuator controller 310 is transferred to the control signal generator 311 of the actuator controller 310. The control signal generator 311 generates a control signal for controlling electric current to be supplied based on the electric current correction value. Here, the control signal generator 311 generates the PWM control signal and the power supplier 353 supplies the PWM electric current based on the generated PWN control signal. Therefore, the control signal generator 311 may generate the PWM control signal for adjusting a duty ratio of the PWM electric current that is the electric current to be supplied (S170).

The PWM control signal generated by the control signal generator 311 of the actuator controller 310 based on the electric current correction value is transferred to the power supplier 353 of the actuator driving device 350. The PWM electric current is supplied to the shape-memory member 410 of the actuator 400 based on the PWM control signal (S120).

By repeatedly performing this process, it is possible to supply electric current complying with the condition for operating the shape-memory member.

Each process operation of the above-described method of controlling the in-vehicle operating device according to the exemplary embodiment is described in detail with reference to FIGS. 34, 35A, 35B, and 35C.

Figure 35A:
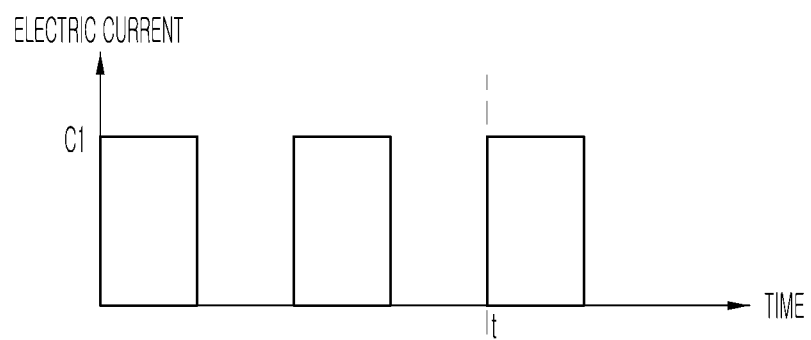
FIGS. 35A, 35B, and 35C are views each illustrating an implementation example of correction of supplied electric current in the method of controlling the in-vehicle operating device according to the exemplary embodiment.
Figure 35B:
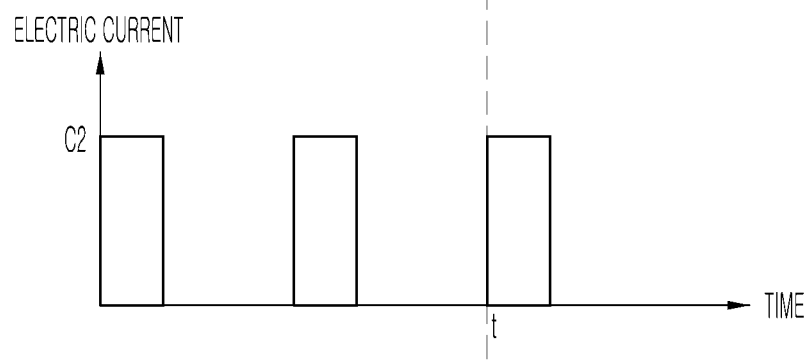
Figure 35C:
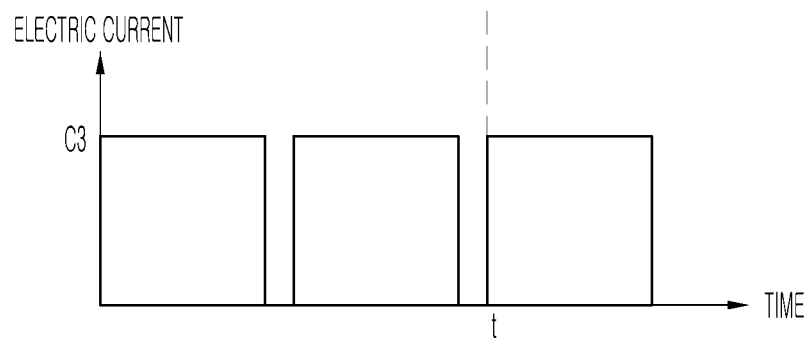

FIG. 34 is a view illustrating an implementation example of the amount of electric current and the amount of supplied electric current in the in-vehicle operating device according to the exemplary embodiment. FIGS. 35A, 35B, and 35C are views each illustrating an implementation example of the correction of the supplied electric current in the method of controlling the in-vehicle operating device according to the exemplary embodiment.

Referring to FIG. 34, when the reference amount of electric current, which is an amount of electric current required for time t to comply with the condition for operating the shape-memory member is $A_{st}$, it is possible that the actuator driving device 350 performs a consistent process operation in the in-vehicle operating device required to supply electric current C1 to the shape-memory member 410 of the actuator 400. Accordingly, the actuator controller 310 transfers the control signal to the actuator driving device 350 so that electric current C1 is supplied, but actual electric current supplied from the actuator driving device 350 may be different from C1 for various reasons. When a difference between the supplied electric current and C1 exceeds a predetermined acceptable error range, consistent process operation of the in-vehicle operating device is impossible. Further, the shape-memory member 410 may be permanently deformed.

Therefore, according to the exemplary embodiment, the actual supplied electric current is corrected, and corrected electric current is supplied to the actuator. For example, a case in which a difference between an amount $A_{up}$ of actual supplied electric current and the reference amount $A_{st}$ of electric current exceeds the acceptable error range is described.

The actuator driving device 350 measures actual supplied electric current C2 generated from the amount $A_{up}$ of actual supplied electric current, and transfers a measurement result to the actuator controller 310. Then, the actuator controller 310 compares the amount $A_{up}$ of actual supplied electric current generated from the actual supplied electric current C2 and the reference amount $A_{st}$ of electric current, determines whether correction of the electric current is required for analysis, determines a correction value as a result of the analysis, and transfers the control signal based on the correction value to the actuator driving device 350.

For example, when the PWM electric current as illustrated in FIG. 35A is actual supplied electric current, the actuator controller 310 adjusts the duty ratio so that an amount of electric current supplied for time t is decreased to the reference amount $A_{st}$ of electric current, and transfers the PWM control signal to the actuator driving device 350. The actuator driving device 350 supplies the PWM electric current with the duty ratio adjusted as illustrated in FIG. 35B according to the control signal to which the correction value is reflected, and difference from the reference amount $A_{st}$ of electric current during time t is within the acceptable error range.

Alternatively, a case in which a difference between an amount $A_{down}$ of actual supplied electric current and the reference amount $A_{st}$ of electric current is out of the acceptable error range is described with reference to FIG. 34.

The actuator driving device 350 measures actual supplied electric current C3 generated from the amount $A_{down}$ of actual supplied electric current, and transfers a measurement result to the actuator controller 310. Then, the actuator controller 310 compares the amount $A_{down}$ of actual supplied electric current generated from the actual supplied electric current C3 and the reference amount $A_{st}$ of electric current, determines whether correction of the electric current is required for analysis, determines a correction value as a result of the analysis, and transfers the control signal based on the correction value to the actuator driving device 350.

For example, when the PWM electric current as illustrated in FIG. 35A is actual supplied electric current, the actuator controller 310 adjusts the duty ratio so that an amount of electric current supplied for time t is decreased to the reference amount $A_{st}$ of electric current, and transfers the PWM control signal to the actuator driving device 350. The actuator driving device 350 supplies the PWM electric current with the duty ratio adjusted as illustrated in FIG. 35C according to the control signal to which the correction value is reflected, and difference from the reference amount $A_{st}$ of electric current during time t is within the acceptable error range.

Moreover, the shape-memory member has a temperature-sensitive operation characteristic. In a case where temperature rises, the shape-memory member becomes relatively long and resistivity increases. Accordingly, even if the same amount of electric current is supplied, a density of electric current is decreased, and an operation speed is decreased. Conversely, when temperature is lowered, the length of the shape-memory member is relatively short and resistivity is lowered. Accordingly, even if the same amount of electric current is supplied, the density of electric current is increased, and the operation speed is increased.

A method of controlling the in-vehicle operating device according to another exemplary embodiment is described with reference to a flowchart in FIG. 36.

The electric current analyzer 315 of the actuator controller 310 receives the environmental information on the vehicle through the vehicle communication interface 530. The environment information may include information on temperature within the vehicle.

Figure 36:
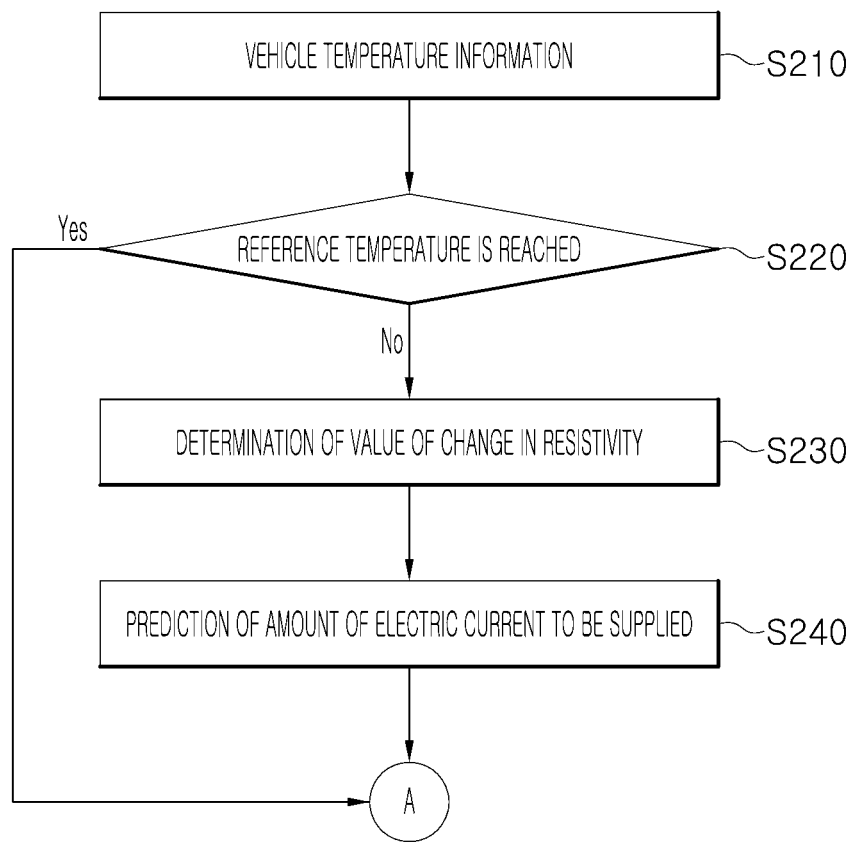
FIG. 36 is a flowchart for a method of controlling the in-vehicle operating device according to another exemplary embodiment.

Referring to FIG. 36, when the information on the temperature within the vehicle is received as the environmental information (S210), the electric current analyzer 315 of the actuator controller 310 determines whether current temperature inside the vehicle has reached reference temperature in compliance with the condition for operating the shape-memory member corresponding to actual supplied electric current (S220).

If a difference between the current temperature within the vehicle and the reference temperature is within an acceptable error range, no special correction according to the environmental condition is necessary. However, if the difference between the current temperature within the vehicle and the reference temperature is outside the acceptable error range, the supplied electric current is corrected to ensure consistent process operation of the in-vehicle operating device.

To this end, the electric current analyzer 315 of the actuator controller 310 compares the internal temperature of the vehicle and the reference temperature, and determines a value of a change in resistivity of the shape-memory member due to a change in temperature (S230). The electric current analyzer 315 predicts the amount of electric current to be supplied based on the value of the change in the resistivity (S240).

Then, as illustrated in FIG. 33, the electric current analyzer 315 compares the amount of supplied electric current with the reference amount of electric current based on the predicted amount of electric current to be supplied (S140), determines whether the correction is required for analysis (S150), and transfers a result of the analysis to the correction value determiner 313 of the actuator controller 310.

The correction value determiner 313 determines the electric current correction value based on the analysis result by the electric current analyzer 315 (S160). Then, according to the electric current correction value determined by the correction value determiner 313, the control signal generator 311 generates the control signal to which the correction value is reflected, and transfers the generated control signal to the actuator driving device 350.

Each process operation of the above-described method of controlling the in-vehicle operating device by considering the environmental condition according to the exemplary embodiment is described in detail with reference to FIGS. 37, 38A, 38B, and 38C.

Figure 37:
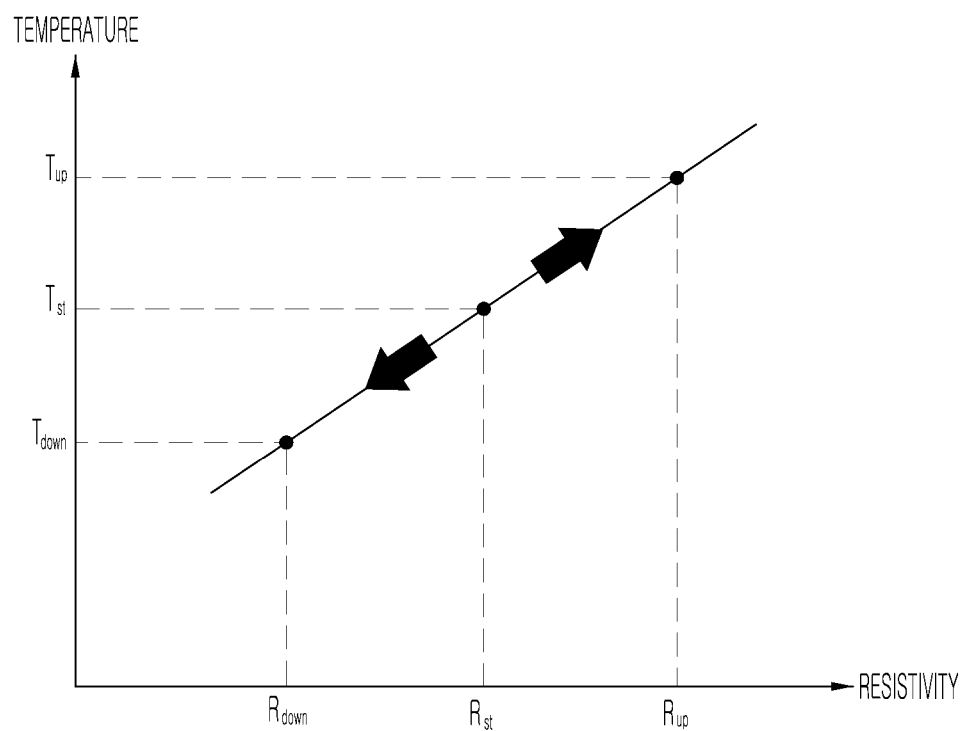
FIG. 37 is a view illustrating an implementation example of a value of resistance change of the shape-memory member due to a temperature change in the in-vehicle operating device according to the exemplary embodiment.
Figure 38A:
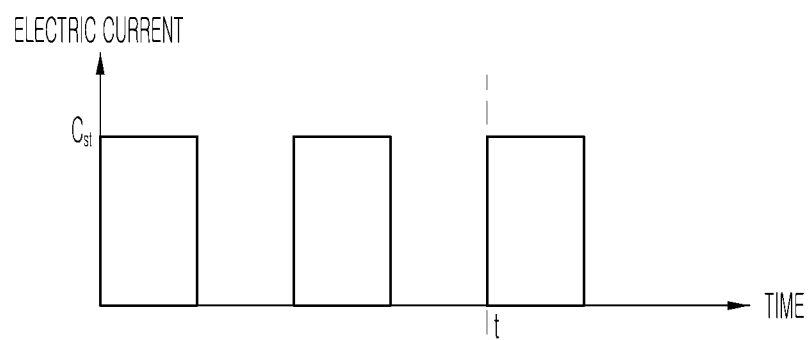
FIGS. 38A, 38B, and 38c are views each illustrating an implementation example of the correction of the supplied electric current based on the value of resistance change in the method of controlling the in-vehicle operating device according to the exemplary embodiment.
Figure 38B:
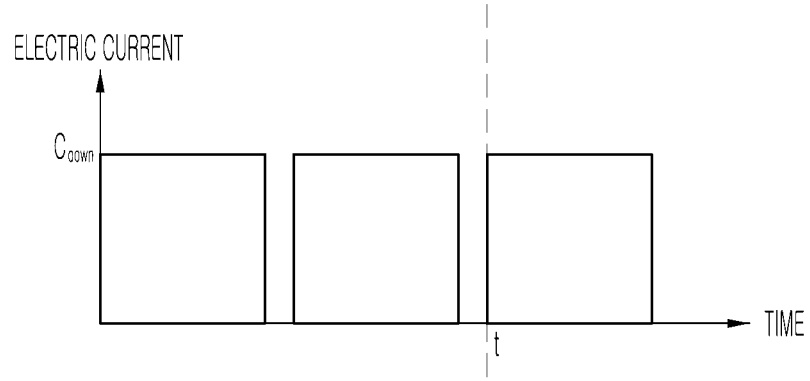
Figure 38C:
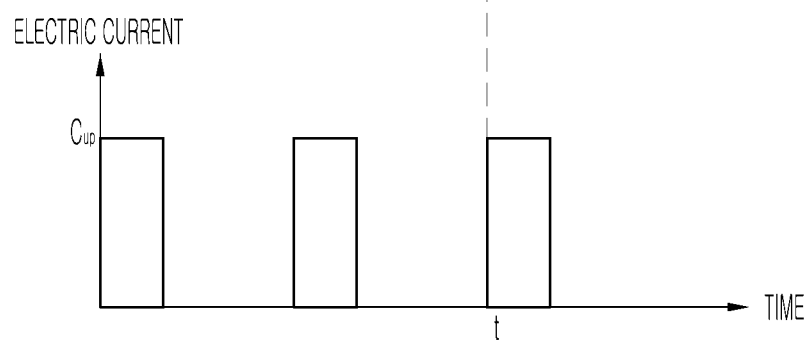

FIG. 37 is a view illustrating an implementation example of the value of the change in the resistivity of the shape-memory member due to the change in the temperature in the in-vehicle operating device according to the exemplary embodiment. FIGS. 38A, 38B, and 38C are views each illustrating an implementation example of correction of the supplied electric current based on the value of the change in the resistivity in the method of controlling the in-vehicle operating device according to the exemplary embodiment.

The shape-memory member has a physical property of being sensitive to temperature. This physical property is expressed as a function of temperature. For example, referring to FIG. 32, a value of resistivity in compliance with each condition for operating is a value of resistivity measured at a reference temperature. If temperature is changed, the value of resistivity in compliance with each operating condition is also changed according to the degree of change.

Referring to FIG. 37, when the value $R_{st}$ of the resistivity in compliance with the condition for operating the shape-memory member is set as reference temperature $T_{st}$, if a difference between actual temperature within the vehicle in which the shape-memory member operates and the reference temperature $T_{st}$ is outside an acceptable error range, a value of resistivity in compliance with the condition for operating the shape-memory member is also changed. Therefore, the reference amount of electric current set to the reference temperature $T_{st}$ is also changed.

Here, when a difference between actual temperature $T_{up}$ within the vehicle and the reference temperature $T_{st}$ exceeds an upper limit of the acceptable error range, the actuator controller 310 compares the actual temperature $T_{up}$ within the vehicle with the reference temperature $T_{st}$ and determines the change value in the resistivity of the shape-memory member accordingly. The value of the change in the resistivity may be calculated as a function of temperature of the shape-memory member.

The actuator controller 310 determines a correction value according to a change in temperature and transfers the control signal based on the correction value to the actuator driving device 350. For example, when PWM electric current $C_{st}$ as illustrated in FIG. 38A is supplied electric current at the reference temperature $T_{st}$, the actual temperature $T_{up}$ within the vehicle is increased to be higher than the reference temperature $T_{st}$, so that the resistivity of the shape-memory member increases. Thus, under the same power supply condition, a magnitude of current is decreased as illustrated in FIG. 38B.

Accordingly, the actuator controller 310 adjusts the duty ratio so that the amount of supplied electric current for time t reaches the reference amount of electric current, and transfers the PWM control signal to the actuator driving device 350. The actuator driving device 350 supplies the PWM electric current with the duty ratio adjusted as illustrated in FIG. 38B according to the control signal to which the correction value is reflected, and difference from the reference amount of electric current during time t is within the acceptable error range.

Conversely, in a case of FIG. 37, when a difference between actual temperature $T_{down}$ within the vehicle and the reference temperature $T_{st}$ exceeds a lower limit of the acceptable error range, the actuator controller 310 compares the actual temperature $T_{down}$ within the vehicle with the reference temperature $T_{st}$ and determines the change value in the resistivity of the shape-memory member accordingly.

The actuator controller 310 determines a correction value according to a change in temperature and transfers the control signal based on the correction value to the actuator driving device 350. For example, when the PWM electric current $C_{st}$ as illustrated in FIG. 38A is supplied electric current at the reference temperature $T_{st}$, the actual temperature $T_{up}$ within the vehicle is decreased to be lower than the reference temperature $T_{st}$, so that the resistivity of the shape-memory member decreases. Thus, under the same power supply condition, a magnitude of current is increased as illustrated in FIG. 38C.

Accordingly, the actuator controller 310 adjusts the duty ratio so that the amount of supplied electric current for time t reaches the reference amount of electric current, and transfers the PWM control signal to the actuator driving device 350. The actuator driving device 350 supplies the PWM electric current with the duty ratio adjusted as illustrated in FIG. 38C according to the control signal to which the correction value is reflected, and difference from the reference amount of electric current during time t is within the acceptable error range.

As described above, according to the exemplary embodiment, the electric current supplied to the shape-memory member of the actuator that moves the operation module is fed back and electric current according to the correction is supplied in compliance with the condition for operating the shape-memory member. Thus, the consistent process operation of the in-vehicle operating device can be possible.

In addition, an adjustment is made so that a constant voltage is applied to the shape-memory member while power is supplied from the vehicle battery. Thus, the inconsistency of the process operation of the in-vehicle operating device due to a change in voltage can be eliminated. Further, it is possible to prevent the shape-memory member from being damaged.

Moreover, according to the exemplary embodiment, electric current is supplied in consideration of the change in the resistivity of the shape-memory member due to the change in temperature. Thus, regardless of a change of season or a change of a region in which the in-vehicle operating device is used, the consistent process operation of the in-vehicle operating device can always be ensured.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. An in-vehicle operating device comprising:
   a panel constituting a vehicle interior component and having an opening;
   an operation module provided to be movable backward and forward in a first direction through the opening between a first position and a second position spaced apart from each other, with a button operated by a user being disposed on a front end thereof;
   a cam mechanism comprising a cam element and a cam pin, wherein the cam element has a guidance path extending in a second direction intersecting with the first direction and the cam pin is connected to and movable along the guidance path;
   an actuator comprising a plurality of shape-memory members contracting by applying current when heated and restored to an original state thereof when cooled, the plurality of shape-memory members configured to cause relative movement between the cam element and the cam pin along the guidance path using a force generated during contraction, wherein the plurality of shape-memory members includes at least one first shape-memory member configured to move the operation module to the first position according to the relative movement and at least one second shape-memory member configured to move the operation module to the second position according to the relative movement; and
   a controller configured to supply current to the actuator while maintaining a voltage provided from a vehicle battery within a preset voltage range, and control an amount of current for each of the plurality of shape-memory members included in the actuator according to a condition for operating each of the plurality of shape-memory members.

2. The in-vehicle operating device of claim 1, wherein the controller comprises an actuator driving device configured to supply current to the actuator according to a control signal while maintaining the voltage provided from the vehicle battery within the preset voltage range, and an actuator controller configured to transfer a control signal for controlling an amount of current for the actuator according to the condition for operating each of the plurality of shape-memory members to the actuator driving device.

3. The in-vehicle operating device of claim 2, wherein further comprising a plurality of actuator driving devices corresponding to the plurality of shape-memory members, and the actuator controller individually transfers the control signal to each of the plurality of actuator driving devices.

4. The in-vehicle operating device of claim 3, wherein the actuator comprises a plurality of first shape-memory members and a plurality of second shape-memory members, the actuator controller generates control signals for alternately or selectively controlling the plurality of first shape-memory members or the plurality of second shape-memory members to move the operation module to the first position or the second position, and the actuator driving device alternately or selectively supplies current to the plurality of first shape-memory members or the plurality of second shape-memory members according to the control signals while maintaining the voltage provided from the vehicle battery within the preset voltage.

5. The in-vehicle operating device of claim 4, wherein the actuator controller generates the control signals for alternately or selectively controlling the plurality of the first shape-memory members or the plurality of the second shape-memory members based on cycle times during which the first shape-memory member and the second shape-memory member are contracted and restored to the original state thereof according to the supply of current.

6. The in-vehicle operating device of claim 2, wherein the actuator driving device comprises:

a power converter configured to convert the voltage provided from the vehicle battery into a predetermined voltage and maintain the converted voltage within a voltage range;

a power supplier configured to supply current to each of the shape-memory members included in the actuator according to the control signal; and an electric current detector configured to measure the current supplied to each of the shape-memory members.

7. The in-vehicle operating device of claim 6, wherein the actuator controller comprises:

an electric current analyzer configured to compare an amount of supplied current measured by the electric current detector and a reference amount of current according to the condition for operating, and analyze a result;

a correction value determiner configured to determine a current correction value based on a result of the analysis by the electric current analyzer; and a control signal generator configured to generate a control signal for controlling current to be supplied based on the current correction value.

8. The in-vehicle operating device of claim 7, wherein the control signal generator generates a control signal as a PWM (Pulse Width Modulation) signal for controlling a duty ratio of the current to be supplied based on the current correction value.

9. The in-vehicle operating device of claim 7, wherein the actuator controller further comprises a vehicle communication interface for receiving vehicle temperature information, and the electric current analyzer receives the vehicle temperature information from the vehicle communication interface and predicts an amount of current to be supplied based on a value of a change in resistivity due to a change in temperature.

10. The in-vehicle operating device of claim 1, further comprising:

a sensor configured to sense a user's motion for operating the button, wherein the controller controls operation of the actuator based on a sensing signal from the sensor.

11. The in-vehicle operating device of claim 1, further comprising:

a finishing skin that is flexible and covers a surface of the panel with the button to provide a finishing surface, with a portion covering button of the finishing skin being moved together with the button so that a shape of the finishing surface changes according to a moving direction of the button.

12. A method of controlling an in-vehicle operation device, the method comprising:

generating, by a controller, a PWM control signal based on a reference amount of current according to a condition for operating a shape-memory member;

supplying, by the controller, a PWM current to an actuator including the shape-memory member according to a control signal while maintaining a voltage within a preset voltage range; and moving, by the actuator, an operation module using deformation of the shape-memory member by application of current.

13. The method of claim 12, wherein the supplying of the PWM current comprises:

measuring current supplied to the actuator; and comparing an amount of measured supplied current and the reference amount of current, determining a current correction value according to a result of the comparison, and generating a PWM control signal for controlling current to be supplied based on the current correction value.

14. The method of claim 13, wherein the comparing of the amount of supplied current comprises:

acquiring vehicle temperature information;

predicting an amount of current to be supplied based on a value of resistance change due to temperature change; and comparing the predicted amount of current and the reference amount of current.

15. The method of claim 14, wherein the comparing of the amount of supplied current comprises generating a PWM control signal for adjusting a PWM current duty ratio of the current to be supplied based on the current correction value.

16. The method of claim 12, wherein the actuator comprises a plurality of shape-memory members including at least one first shape-memory member configured to move the operation module to a first position and at least one second shape-memory member configured to move the operation module to a second position, and wherein the controller performs the generating of the PWM control signal, the supplying of the PWM current, and the moving of the operation module for each of the plurality of shape-memory members included in the actuator.

17. The method of claim 14, wherein the actuator comprises a plurality of shape-memory members including at least one first shape-memory member configured to move the operation module to a first position and at least one second shape-memory member configured to move the operation module to a second position, and wherein the controller performs the generating PWM control signal, the supplying PWM current, the moving operation module, and the comparing amount of supplied current for each of the plurality of shape-memory members included in the actuator.

18. The method of claim 14, wherein the actuator comprises a plurality of first shape-memory members configured to move the operation module to a first position and a plurality of second shape-memory member configured to move the operation module to a second position, and wherein the controller performs the generating of the PWM control signal, the supplying of the PWM current, the moving of the operation module, and the comparing of the amount of supplied current to alternately or selectively control the plurality of first shape-memory members or the plurality of second shape-memory member to move the operation module to the first position or the second position.

19. The method of claim 18, wherein the controller performs the generating of the PWM control signal, the supplying of the PWM current, the moving of the operation module, and the comparing of the amount of supplied current to alternately or selectively control the plurality of first shape-memory members or the plurality of second shape-memory member based on cycle times during which the first shape-memory member and the second shape-memory member are contracted and restored to an original state thereof according to the supply of current.

20. The method of claim 12, wherein the generating is performed by receiving a sensing signal from a sensor that detects a user's manipulation of a button.

* * * * *